(12) United States Patent
Haldar

(10) Patent No.: US 11,645,290 B2
(45) Date of Patent: May 9, 2023

(54) POSITION DEBIASED NETWORK SITE SEARCHES

(71) Applicant: Airbnb, Inc., San Francisco, CA (US)

(72) Inventor: Malay Haldar, Foster City, CA (US)

(73) Assignee: Airbnb, Inc., San Francisco, CA (US)

( * ) Notice: Subject to any disclaimer, the term of this patent is extended or adjusted under 35 U.S.C. 154(b) by 692 days.

(21) Appl. No.: 16/600,993

(22) Filed: Oct. 14, 2019

(65) Prior Publication Data

US 2021/0109939 A1    Apr. 15, 2021

(51) Int. Cl.
*G06F 16/2457* (2019.01)
*G06N 3/04* (2023.01)
*G06N 3/08* (2023.01)
*G06F 16/9538* (2019.01)

(52) U.S. Cl.
CPC .... *G06F 16/24578* (2019.01); *G06F 16/9538* (2019.01); *G06N 3/0454* (2013.01); *G06N 3/08* (2013.01)

(58) Field of Classification Search
None
See application file for complete search history.

(56) References Cited

U.S. PATENT DOCUMENTS

| | | | | |
|---|---|---|---|---|
| 2011/0289025 A1* | 11/2011 | Yan | .................. | G06N 5/025 706/47 |
| 2014/0149429 A1* | 5/2014 | Gao | .................. | G06F 16/337 707/748 |
| 2019/0188295 A1* | 6/2019 | Sirotkovic | ........... | G06N 3/0454 |
| 2020/0401643 A1* | 12/2020 | Liu | .................. | G06F 16/9538 |

* cited by examiner

*Primary Examiner* — Amresh Singh
(74) *Attorney, Agent, or Firm* — Schwegman Lundberg & Woessner, P.A.

(57) ABSTRACT

A position debiased search system can avoid bias towards top-ranked search results using a position-trained machine-trained model. Past positions for listings can be input into the model with added noise and low-ranked results to train the model to generate rankings that do not exhibit position bias. A network site can implement the position debiased search system to generate network site results that can generate accurate user results in real time as users browse the network site.

14 Claims, 20 Drawing Sheets

POSITION DEBIASED NETWORK SITE SEARCHES

TECHNICAL FIELD

The present disclosure generally relates to special-purpose machines that manage data processing and improvements to such variants, and to the technologies by which such special-purpose machines become improved compared to other special-purpose machines for generating accurate search results.

BACKGROUND

Network site users can submit search queries to return content on the network site. One issue for computer-based searching is that users exhibit bias towards selecting the top few results listed in the results, even if those top ranked results may not be the best results for the user.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
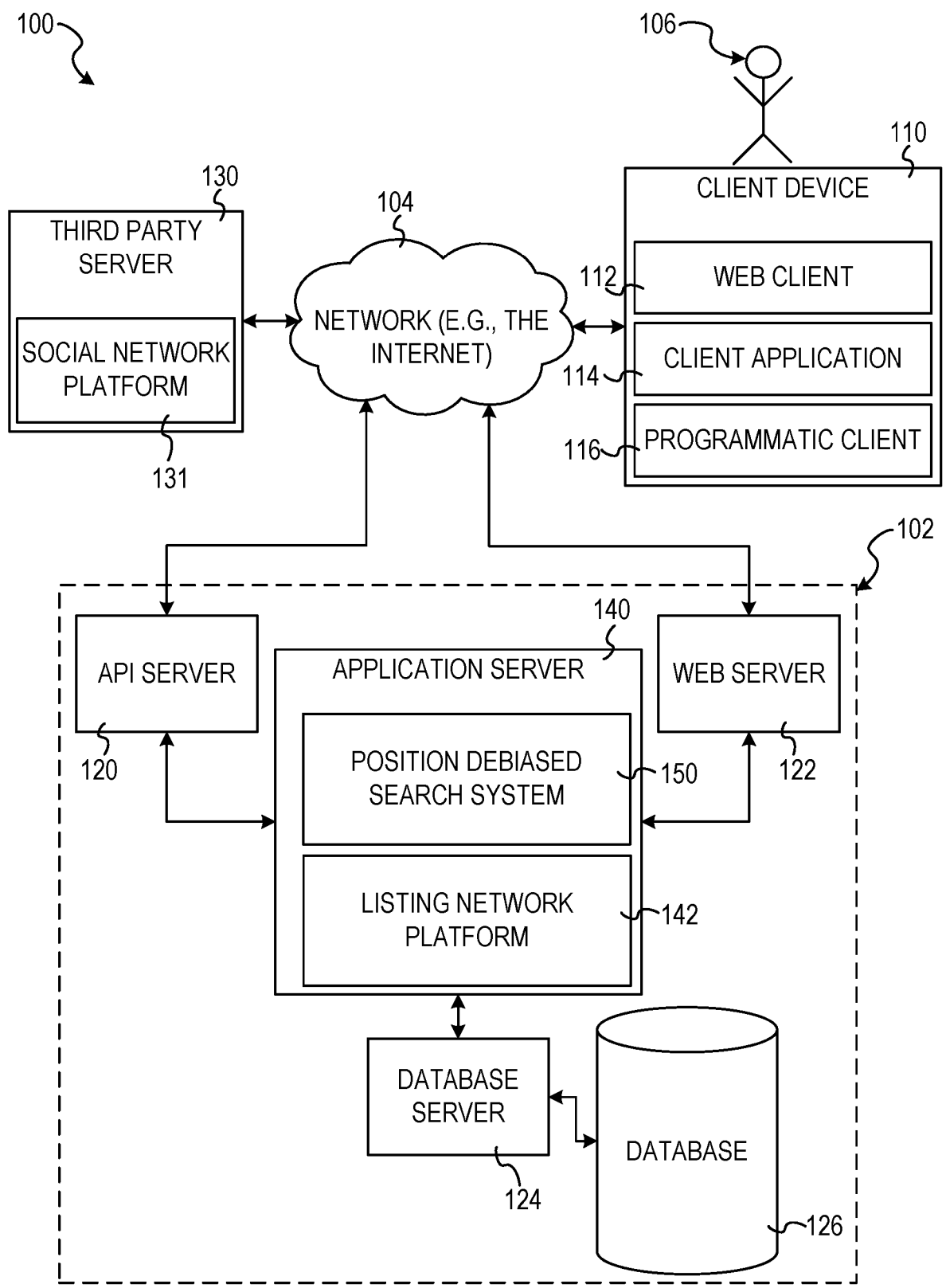
FIG. 1 is a block diagram illustrating a position debiased search system implemented in a networked environment, according to some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Position bias in search results refers to a searching user's tendency to select the top search result even if the top search results are not the best match for the user's query (e.g., search terms, user profile information). Conventional approaches for correcting position bias include boosting low-positioned search results using a discount curve, where the curve increasingly boosts the results that are listed lower in the returned search result set. Boosting low-positioned results (e.g., via a discount curve) can improperly over-rank search results that may not be a good or relevant search result for a user. That is, the low-position boosting approaches may inaccurately handicap and boost a fifth page search result due to the search result appearing on the fifth page, even if the search result is a poor-quality result that is indeed not relevant to the user's search request and is properly relegated to a fifth page position.

To this end, a position debiased search system can be implemented to generate search results that avoid position bias by using position data as input data with injected noise, according to some example embodiments. In contrast to past approaches which merely output positions or rankings, based on input data such as user data and non-position search item data (e.g., title, price, description), the position debiased search system is configured to train on position data as input data, where the position data values are the historical positions in which each listing was displayed for a past search. As discussed here, a listing is a network content item that is published to a network site for viewing by other users. It is appreciated that although listings are discussed in the examples included below, in some example embodiments the position debiased search system is implemented in non-listing search systems, such as an online encyclopedia, a website store, and other types of search systems were data items are searched for and displayed in a ranking.

In some example embodiments, a portion of the position data values in the past dataset are replaced with arbitrary data (e.g., zeros) to act as noise, which forces the machine learning scheme to rely on signals that are buried in other non-position listing features (e.g., price data, listing data, image quantity, location, user profile data, similarity between search terms and listing terms). In some example embodiments, the position debiased search system is further trained using a sample of past results from a past front page (e.g., top 18 results displayed to a past user), and further on unseen results (e.g., randomly selected past search results that were never selected and/or displayed to the past user, such as results listed on a 42nd unnavigated-to page). The unseen or back page results function as examples of position bias for potentially good results that are buried in pages that are not the front page or top ranked set. In this way, the position debiased search system can avoid position bias in generating search results for users of a network site, such as a website or mobile application.

An in-depth analytical approach is here discussed, followed with example embodiments and references to the figures below. Further, though the approaches can be integrated in different machine learning models, according to some example embodiments the machine learning model is a deep, fully connected neural network as discussed in further detail below with reference to FIG. 3B.

Analytically, the position bias issue is posed as: given listings $L_a$ and $L_b$, predict whether the number of users (e.g., guests) who prefer booking $L_a$, denoted by guest($L_a$), is greater than those booking $L_b$, denoted by guest($L_b$). The model's prediction of guest($L_a$)>guest($L_b$) is referred to as the preference prediction: $P_{ref}(L_a, L_b)$. In some example embodiments, to learn $P_{ref}(L_a, L_b)$, example logged listing pairs $\{L_a, L_b\}$ from past historical logs are stored, and the data is augmented with indications of which listing the guest booked. The position bias is referred to as the bias of a user towards the listing at a given position. That is, if $L_a$ appears at $P_a$, and $L_b$ appears at the position $P_b$, the bias is then denoted as Bias($P_a, P_b$) for each given pair of listings.

As mentioned, some conventional approaches use a discount curve to boost low ranking results; however, those approaches assume that low ranking results are all good, when indeed some of the low-ranked results may be bad (e.g., poorly suited to the search request or the user). Thus, the conventional models that boost merely based on position may remove position bias at the cost of degrading the user's preference signals. To address position bias in a way that does not degrade other types of non-position data used in training, the system can inject noise in the position parameter to force the model to train on the least noisy features, i.e., non-position features that have not been altered with noise.

For example, assume a scalar value y(i) is to be predicated, where i=0 to N represent N samples of the scalar value. To predict y(i), the model is given two noisy alternatives $x_1(i)$ and $x_2(i)$. The scalar value can be inferred using a linear predictor: $y(i) = w \cdot x_1(i) + (1-w) \cdot x_2(i)$.

The two noisy sources can be rewritten as: $x_1(i) = y(i) + e_1(i)$ and $x_2(i) = y(i) + e_2(i)$, where $e_1(i)$ and $e_2(i)$ are the errors in estimating y(i), and independent of each other.

The linear predictor can therefore be rewritten as:

$y(i) = w \cdot (y(i) + e_1(i)) + (1-w) \cdot (y(i) + e_2(i))$ $y(i) = y(i) + w \cdot e_1(i) + (1-w) \cdot e_2(i)$ $y(i) = y(i) + w \cdot (e_1(i) - e_2(i)) + e_2(i)$ The square of error estimation of each sample can be written as: $(w \cdot (e_1(i) - e_2(i)) + e_2(i))^2$. Accordingly, the square error over all the N samples is then:

$$\sum_{i=0}^{N} (w * (e_1(i) - e_2(i)) + e_2(i))^2$$

and, the value w for which the total estimation error is minimized is:

$$w = -\sum_{i=0}^{N} (e_1(i) - e_2(i)) * e_2(i) \Big/ \sum_{i=0}^{N} (e_1(i) - e_2(i))^2$$

If $e_1$ and $e_2$ are independent errors with zero mean, the estimation can be rewritten as:

$$w = \sum_{i=0}^{N} e_2(i)^2 \Big/ \left(\sum_{i=0}^{N} e_1(i)^2 + \sum_{i=0}^{N} e_2(i)^2\right)$$

In other words, the weight on an input feature is inversely proportional to the noise in the feature. The model is then configured on a least noisy conjecture: given two alternative ways to predict the label with a non-position feature error and a position feature error, the model will put the weight on the non-position feature information as it has lower error (where noise is injected into the position error data).

The output of the model can be configured as:

modelOutput=log($P_{ref}(L_a,L_b)$)+log(Bias($P_a,P_b$))

Further, according to some example embodiments, for simplicity of scoring, the model is separated into two symmetric parts that work on listing $L_a$ and $L_b$ individually. For shorthand, the preference function acting on a given single listing is denoted by $P_{ref}(\ )$ and bias by Bias( ). Using $F_{listing}$ to denote the input listing features and $F_{query}$ to denote the input query features, the model output for a single listing can be rewritten as:

modelOutput($F_{listing}, F_{query}$)=$P_{ref}(F_{listing}, F_{query})$+Bias($F_{listing}, F_{query}$)

That is, the model is predicting guest preference and position bias as a function of the input features $F_{listing}$ and $F_{query}$. To configure the model to predict guest preference and position bias as a function of the input features $F_{listing}$ and $F_{query}$, a system 150 (FIG. 1) is discussed in three separate steps; however, in some example embodiments, the steps are performed concurrently by the system, as discussed with reference to FIG. 6 below.

In the first step, the position is added as an input feature into the model. Let P denote the position of the listing in the training data; then the model output is:

modelOutput($F_{listing}, F_{query}, P$)=Pref($F_{listing}, F_{query}, P$)+Bias($F_{listing}, F_{query}, P$)

Note that position bias is a function of P and $F_{query}$ alone, and using F listing to predict Bias( ) is an inferior alternative. In forcing the model to rely on the least noisy option, and assuming sufficient training data, the dependence of Bias( ) on $F_{listing}$ disappears, and bias purely as a function of P and $F_{query}$ remains:

modelOutput($F_{listing}, F_{query}, P$)=Pref($F_{listing}, F_{query}, P$)+Bias($F_{query}, P$)

In some example embodiments, the position P is set to 0 during online training. The query features are invariant across the listings. This reduces the bias term to a constant for the given query, and what is left in the model is the preference term only.

In the second step: note that above, preference becomes a function of $F_{listing}$, $F_{query}$ and P. In fact, the position feature P is a contender to explain guest preference since it is derived from the previous model score. As a result, when P is set to 0, the model is then:

modelOutput($F_{listing}, F_{query}, 0$)=$P_{ref}(F_{listing}, F_{query}, 0)$

Which is a weak predictor of guest preference because during training the model was relying on P to explain preference. To address this issue, instead of directly adding position as a feature, a noisy version of position, $P_{noisy}$, is added, so the model output becomes:

modelOutput($F_{listing}, F_{query}, P_{noisy}$)=Pref($F_{listing}, F_{query}, P_{noisy}$)+Bias($F_{listing}, F_{query}, P_{noisy}$)

The noisy version of P is created by randomly setting it to 0 during training for a fraction of the examples. For example:

$P_{noisy}$=rand( )>0.15?P:0

With the noise in $P_{noisy}$, $F_{listing}$ and $F_{query}$ become much stronger alternatives to explain guest preference, so in seeking the least noisy option, the model output is then:

$$\text{modelOutput}(F_{listing}, F_{query}, P_{noisy}) = P_{ref}(F_{listing}, F_{query}) + \text{Bias}(F_{query}, P_{noisy})$$

When we set $P_{noisy}=0$ during online scoring, the model is left with $P_{ref}(F_{listing}, F_{query})$ for prediction.

In step 3, to improve the bias estimate, the model is trained with the unseen results logged in the historical data, according to some example embodiments. The historical data contains not only the listings that the guest saw, but also the top 800 results that the guest did not see (e.g., listings on page 5, which the user did not navigate to). Conventionally, training on the unseen results is not a good approach since it forces the model to put more focus on predicting the bias term; however, here, when trying to debias the model, the unseen results function as useful examples of listings that were buried under bias. For instance, the front page or "seen" examples can be augmented with 18 randomly sampled unseen results from lower positions (e.g., other pages), that the model can use as extreme cases of position bias. Although position bias can be inferred from the first page results, the real victims of position bias are the listings that are pushed down from the first page, away from view. Whereas conventional approaches can remain blissfully unaware of the errors in boosting lower unseen results, the position debiased model samples from the unseen listings, which function as extreme examples of how bias affects the unseen listings low book rate.

With reference to FIG. 1, an example embodiment of a high-level client-server-based network architecture 100 is shown. A networked system 102, in the example forms of a network-based marketplace or payment system, provides server-side functionality via a network 104 (e.g., the Internet or wide area network (WAN)) to one or more client devices 110. In some implementations, a user (e.g., user 106) interacts with the networked system 102 using the client device 110.

FIG. 1 illustrates, for example, a web client 112 (e.g., a browser), client application(s) 114, and a programmatic client 116 executing on the client device 110. The client device 110 includes the web client 112, the client application(s) 114, and the programmatic client 116 alone, together, or in any suitable combination. Although FIG. 1 shows one client device 110, in other implementations, the network architecture 100 comprises multiple client devices.

In various implementations, the client device 110 comprises a computing device that includes at least a display and communication capabilities that provide access to the networked system 102 via the network 104. The client device 110 comprises, but is not limited to, a remote device, work station, computer, general purpose computer, Internet appliance, hand-held device, wireless device, portable device, wearable computer, cellular or mobile phone, Personal Digital Assistant (PDA), smart phone, tablet, ultrabook, netbook, laptop, desktop, multi-processor system, microprocessor-based or programmable consumer electronic, game consoles, set-top box (STB), network personal computer (PC), mini-computer, and so forth. In an example embodiment, the client device 110 comprises one or more of a touch screen, accelerometer, gyroscope, biometric sensor, camera, microphone, Global Positioning System (GPS) device, and the like.

The client device 110 communicates with the network 104 via a wired or wireless connection. For example, one or more portions of the network 104 comprises an ad hoc network, an intranet, an extranet, a Virtual Private Network (VPN), a Local Area Network (LAN), a wireless LAN (WLAN), a WAN, a wireless WAN (WWAN), a Metropolitan Area Network (MAN), a portion of the Internet, a portion of the Public Switched Telephone Network (PSTN), a cellular telephone network, a wireless network, a Wireless Fidelity (WI-FI®) network, a Worldwide Interoperability for Microwave Access (WiMax) network, another type of network, or any suitable combination thereof.

In some example embodiments, the client device 110 includes one or more of the applications (also referred to as "apps") such as, but not limited to, web browsers, book reader apps (operable to read e-books), media apps (operable to present various media forms including audio and video), fitness apps, biometric monitoring apps, messaging apps, electronic mail (email) apps, e-commerce site apps (also referred to as "marketplace apps"), and reservation applications for temporary stays at hotels, motels, or residences manages by other end-users (e.g., a posting user that owns a home and rents out the entire home or private room). In some implementations, the client application(s) 114 include various components operable to present information to the user and communicate with networked system 102. In some embodiments, if the e-commerce site application is included in the client device 110, then this application is configured to locally provide the user interface and at least some of the functionalities with the application configured to communicate with the networked system 102, on an as needed basis, for data or processing capabilities not locally available (e.g., access to a database of items available for sale, to authenticate a user, to verify a method of payment). Conversely, if the e-commerce site application is not included in the client device 110, the client device 110 can use its web browser to access the e-commerce site (or a variant thereof) hosted on the networked system 102.

The web client 112 accesses the various systems of the networked system 102 via the web interface supported by a web server 122. Similarly, the programmatic client 116 and client application(s) 114 accesses the various services and functions provided by the networked system 102 via the programmatic interface provided by an Application Program Interface (API) server 120.

Users (e.g., the user 106) comprise a person, a machine, or other means of interacting with the client device 110. In some example embodiments, the user 106 is not part of the network architecture 100, but interacts with the network architecture 100 via the client device 110 or another means. For instance, the user 106 provides input (e.g., touch screen input or alphanumeric input) to the client device 110 and the input is communicated to the networked system 102 via the network 104. In this instance, the networked system 102, in response to receiving the input from the user 106, communicates information to the client device 110 via the network 104 to be presented to the user 106. In this way, the user 106 can interact with the networked system 102 using the client device 110.

The API server 120 and the web server 122 are coupled to, and provide programmatic and web interfaces respectively to, one or more application server(s) 140. The application server(s) 140 may host a listing network platform 142 and a position debiased search system 150, each of which comprises one or more modules or applications and each of which can be embodied as hardware, software, firmware, or any combination thereof. The application server(s) 140 are, in turn, shown to be coupled to one or more database server(s) 124 that facilitate access to one or more information storage repositories or database(s) 126. In an example embodiment, the database(s) 126 are storage devices that store information to be posted (e.g., inventory, image data, catalog data) to the listing network platform 142. The database(s) 126 also stores digital goods information in accordance with some example embodiments.

Additionally, a social network platform 131 is illustrated as executing on third-party server(s) 130. Further, the social network platform 131 can programmatically access the networked system 102 via the programmatic interface provided by the API server 120. The social network platform 131 may comprise a social network website, messaging platform, and one or more APIs. In some example embodiments, the electronic message discussed below is a message sent to a given user on via the social network platform 131 messaging system (e.g., social media chat message, post, ping (a "hello" notification), and so on).

The listing network platform 142 provides a number of publication functions and listing services to the users who access the networked system 102. While the listing network platform 142 is shown in FIG. 1 to form part of the networked system 102, it will be appreciated that, in alternative embodiments, the listing network platform 142 may form part of a web service that is separate and distinct from the networked system 102.

In some implementations, the position debiased search system 150 provides functionality to train a machine learning model to avoid position bias and return search results for network site searches (e.g., searches for listings managed by the listing network platform 142. The position debiased search system 150 will be discussed further in connection with FIG. 2 below.

While the client-server-based network architecture 100 shown in FIG. 1 employs a client-server architecture, the present inventive subject matter is, of course, not limited to such an architecture, and can equally well find application in a distributed, or peer-to-peer, architecture system, for example. The various systems of the applications server(s) 140 (e.g., the listing network platform 142 and position debiased search system 150) may also be implemented as standalone software programs, which do not necessarily have networking capabilities.

The listing network platform 142 can be hosted on dedicated or shared server machines that are communicatively coupled to enable communications between server machines. The components themselves are communicatively coupled (e.g., via appropriate interfaces) to each other and to various data sources, so as to allow information to be passed between the applications or so as to allow the applications to share and access common data. Furthermore, the components access one or more database(s) 126 via the database server(s) 124. The listing network platform 142 provides a number of publishing and listing mechanisms whereby a seller (also referred to as a "first user") may list (or publish information concerning) goods or services for sale or barter, a buyer (also referred to as a "second user") can express interest in or indicate a desire to purchase or barter such goods or services, and a transaction (such as a trade) may be completed pertaining to the goods or services.

Figure 2:
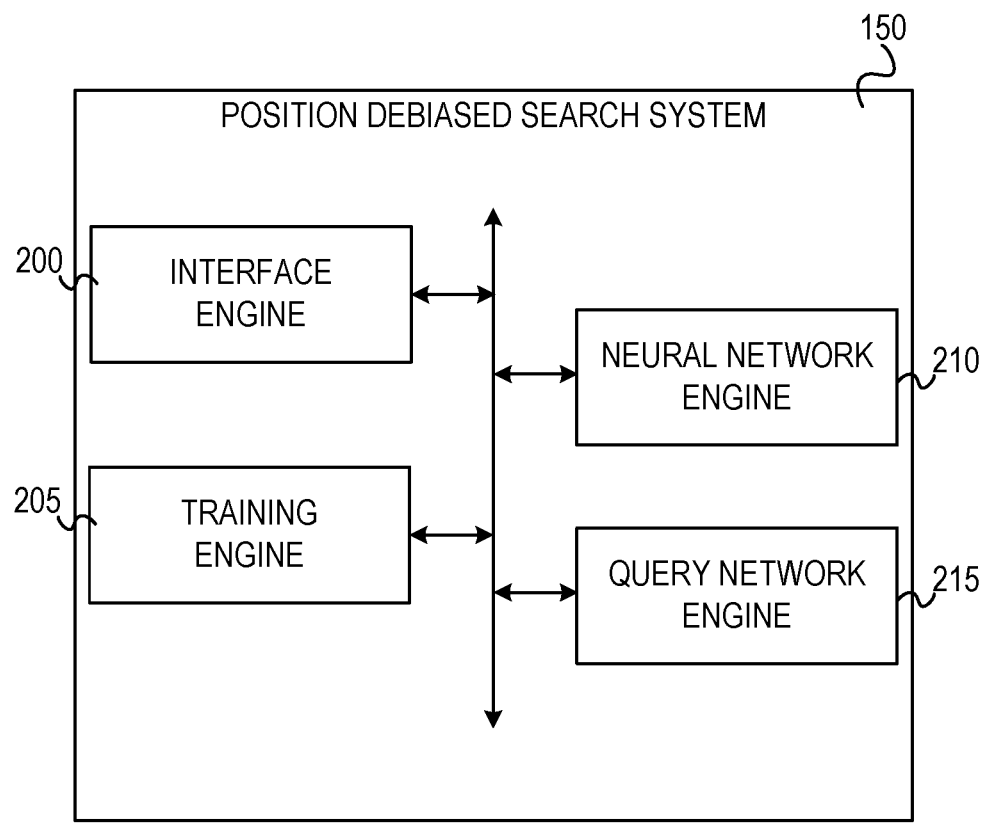
FIG. 2 shows example functional engines of a position search system, according to some example embodiments.

FIG. 2 shows example functional engines of a position debiased search system 150, according to some example embodiments. As illustrated, the position debiased search system 150 comprises an interface engine 200, a training engine 205, a neural network engine 210, and a query network engine 215. The interface engine 200 is configured to generate graphical user interfaces (GUIs) to receive input data such as network site searches from users and generate search result user interfaces for display. The training engine 205 manages training a machine learning scheme (e.g., a neural network) to generate position debiased rankings of search results. The neural network engine 210 is configured to apply the trained machine learning scheme on listings to rank the listings in a position debiased manner. The query network engine 215 is configured to receive a search request from a user and return results from a listings database (e.g., via database server 124).

Figure 3A:
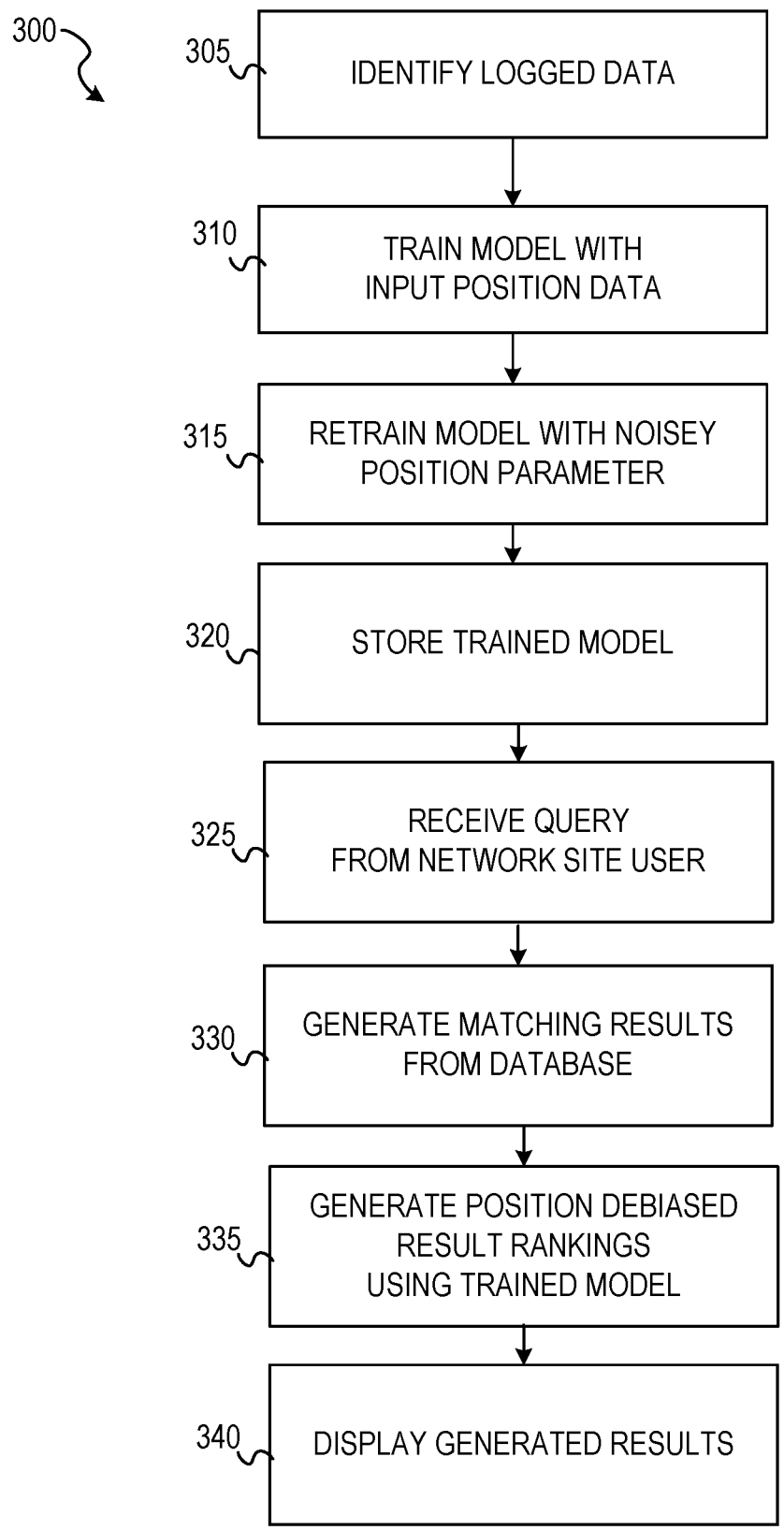
FIG. 3A shows an example flow diagram of a method for generating position debiased search results, according to some example embodiments.

FIG. 3A shows an example flow diagram of a method 300 for generating position debiased search results, according to some example embodiments. In the example method 300, the machine learning model is trained and retrained in subsequent operations (operations 310 and 315), which are further detailed in FIG. 4 and FIG. 5 for clarity. It is appreciated that the training can be configured differently in the system 150. For instance, one or more of the operations of method 300 can be performed by the system 150 concurrently as discussed below with reference to FIG. 6.

At operation 305, the training engine 205 identifies logged data, such as past listing searches submitted by users and the listings returned for each of the searches. At operation 310, the training engine 205 trains a machine learning model with position data of listings in the training data used as input data. For example, at operation 310 the training engine 205 trains a neural network to receive listing data and query data as input data and output ranking data that is free from position bias. In some example embodiments, the machine learning model is a deep neural network as illustrated in FIG. 3B.

Figure 3B:
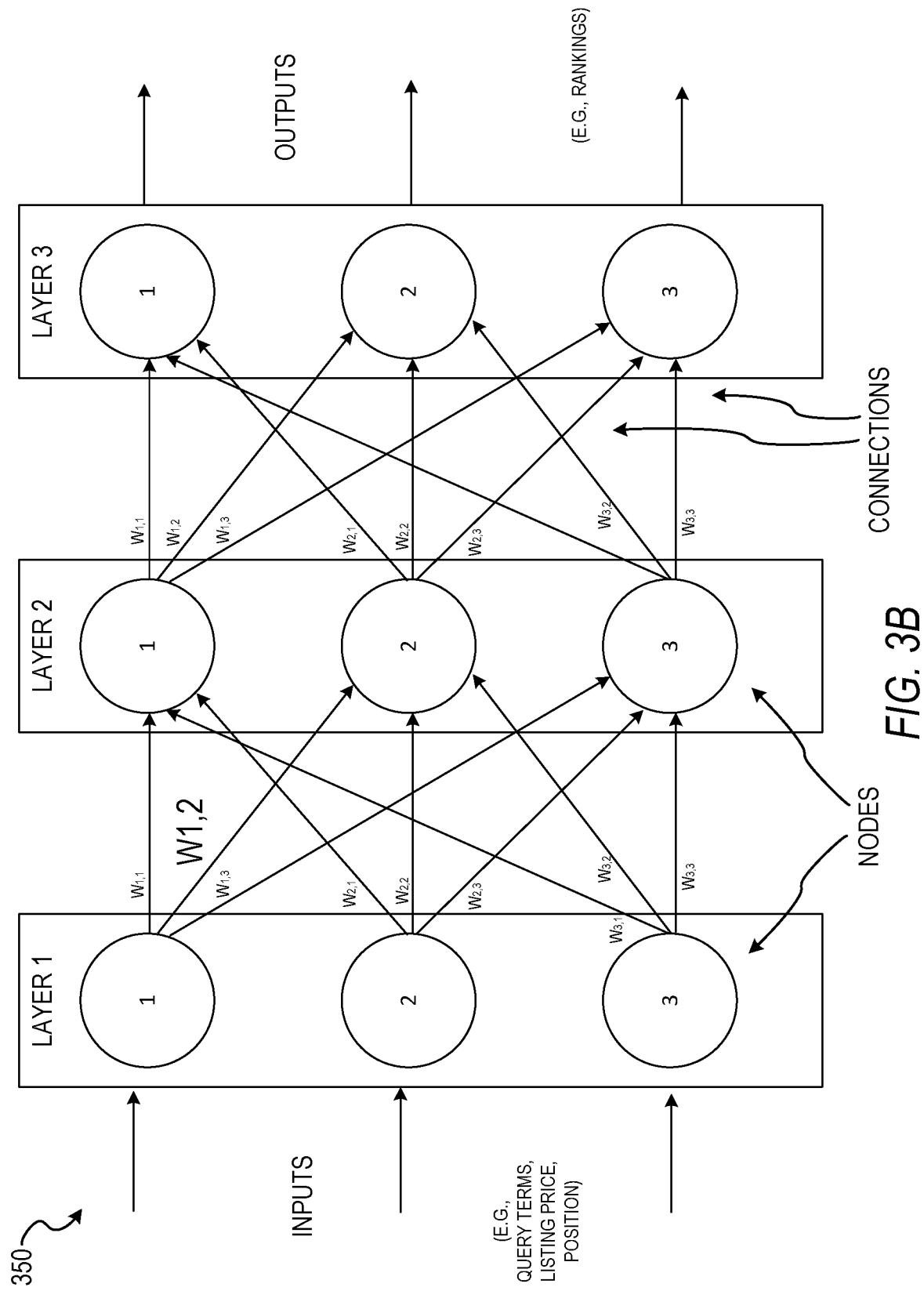
FIG. 3B shows an example position debiased neural network, according to some example embodiments.

FIG. 3B shows an example position debiased neural network 350, according to some example embodiments. As illustrated, the network 350 comprises three layers, each with artificial neurons referred to as nodes. The nodes of each layer are connected to the nodes of other layers via connections, where the weights are the strength of the connections between the respective nodes. In training, the value of the weights is adjusted as a numerical matrix via training using back propagation and gradient descent, according to some example embodiments. A low weight will deemphasize a signal and a high weight will amplify it. For example, the $w_{1,2}$ weight (enlarged font in FIG. 3B) between the first node in the first layer and the second node in the layer diminishes or amplifies the signal between two nodes by numerically diminishing or increasing the value of the data passed across $w_{1,2}$ connection.

The inputs are input data values fed into the network 350 (on the left side). The input data values are numerical representations of different things, like words (e.g., as word embeddings), image quantity, distance from requested location (e.g., requested city), position value, price of a given listing, and so on. Each node receives numeral input values and turns the sum of the given input data using an activation function, such as a sigmoid function. In some example embodiments, the weights of the network 350 are adjusted in training iterations using backpropagation of error, which is the difference between the right answer given by the training data and a given node's actual output.

In some example embodiments, gradient descent is implemented in the training iterations to reduce the minimum function (e.g., reduce error rates). In gradient descent, slopes for the given node functions are generated and small steps are taken in the direction of the greatest downward slope from the current position. Although the example network 350 is illustrated with three layers, it is appreciated that the additional layers can be inserted between the input layer (Layer 1) and the output layer (e.g., Layer 3) to function as deep or "hidden" layers that can adjust weights in the training methods. In the illustrated example, the input data includes the position parameter, query data, and other listing data, and the output is ranking data for the listing. For example, the output data can include a non-integer number (e.g., 0.4859) and each listing's output data is then ranked from greatest to least to rank the corresponding listings.

Returning to FIG. 3A, at operation 315, the training engine 205 re-trains the machine learning model (e.g., the network 350) with noisy position parameters. For example, a portion of the listings (e.g., 15 percent) have their position data values set to zero, as further discussed below. Then at operation 315 the weights are updated using the zeroed-out position values.

At operation 320, the training engine 205 stores the trained machine learning model. At operation 325, the interface engine 200 receives a query from a network site user (e.g., a search for listing or other searchable data items). At operation 330, the query network engine 215 retrieves all matching listings that match the filters or parameters of the received query. At operation 335, the neural network engine 210 generates position debiased results rankings for the results returned at operation 330. At operation 340, the interface engine 200 displays the generated results on a client device of searching user (e.g., client device 110).

Figure 4:
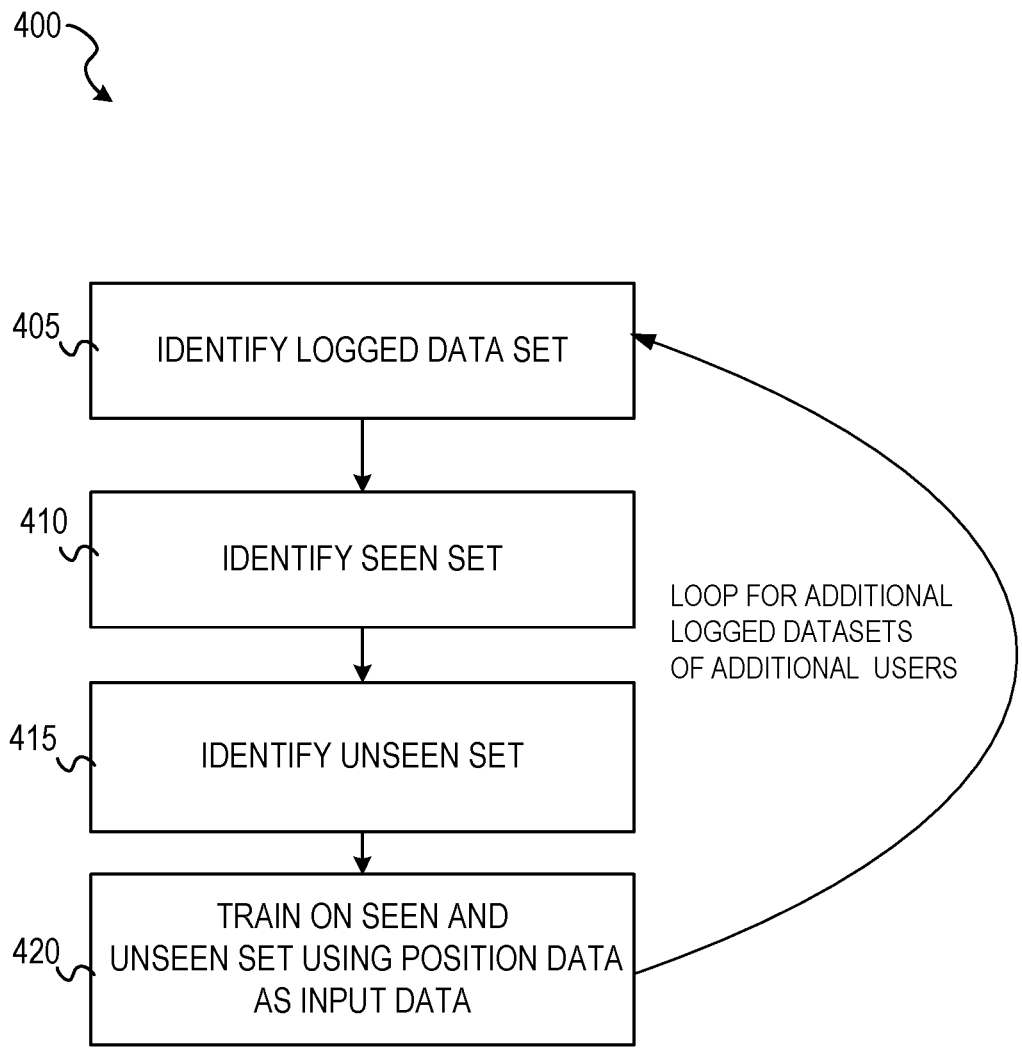
FIG. 4 shows an example flow diagram of an example method for generating position debiased search results using backend search results as training data, according to some example embodiments.

FIG. 4 shows an example flow diagram of an example method 400 for generating position debiased search results using backend search results as training data, according to some example embodiments. In some example embodiments, the method 400 is implemented as a subroutine of operation 310 in which the machine learning model is trained using a position data as input data. At operation 405, the training engine 205 identifies a logged dataset for a user. At operation 410, the training engine 205 identifies a seen set of search results. At operation 415, the training engine 205 identifies an unseen set of search results. At operation 420, the training engine 205 trains the machine learning model on the seen and unseen set of search results using position parameter data for each of the seen and unseen sets of search results as input data. According to some example embodiments, the method 400 then loops to operation 405 for training on additional logged sets of data of other users.

Figure 5:
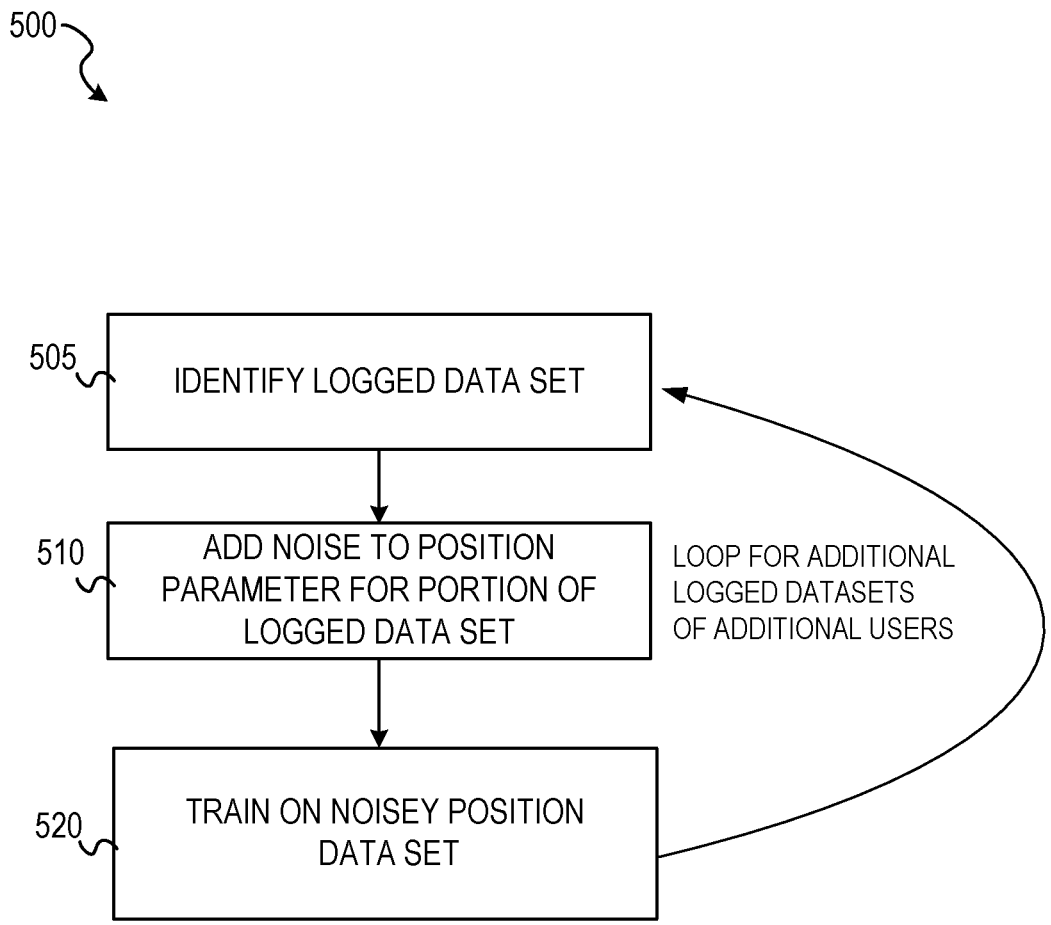
FIG. 5 shows a flow diagram of an example method for training a machine learning model using noisy position parameter data, according to some example embodiments.

FIG. 5 shows a flow diagram of an example method 500 for training a machine learning model using noisy position parameter data, according to some example embodiments. In some example embodiments, the method 500 is implemented as a subroutine of operation 315 in which the machine learning model is retrained using arbitrary noise in the position parameter for each listing in the training set. At operation 505, the training engine 205 identifies a logged dataset for a user (e.g., the logged data of the user of operation 405 in FIG. 4). At operation 510, the training engine 205 adds noise to a position feature of a set of listings in the logged dataset. For example, at operation 510, the training engine 205 sets the position feature values of 15% of the listings in the logged dataset to zero to mimic runtime conditions and force the machine learning model to model the least noisy feature parameters per listing (e.g., price, title, image quantity, listing category such as "entire place", "private room", 'hotel"). At operation 520, the training engine 205 trains the machine learning model on the noise-injected logged dataset. According to some example embodiments, the method 500 then loops to operation 505 for training on additional logged sets of data for other users.

Figure 6:
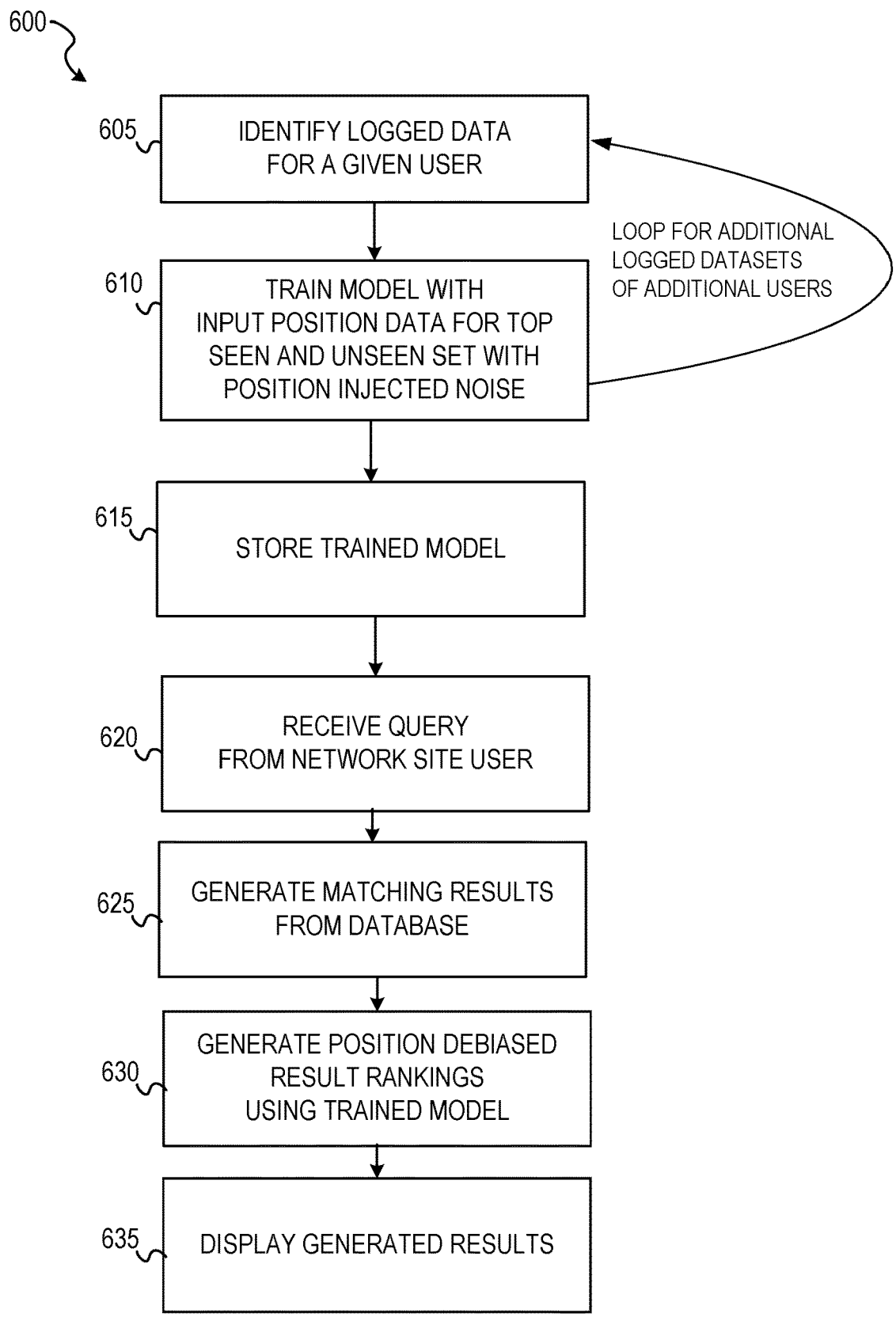
FIG. 6 shows an example flow diagram of a method for implementing the position debiased system with concurrent processing, according to some example embodiments.

FIG. 6 shows an example flow diagram of a method 600 for implementing the position debiased system 150 with concurrent processing, according to some example embodiments. At operation 605, the training engine 205 identifies logged data for a given user. At operation 610, the training engine 205 trains a machine learning model on training data wherein an unseen results set is added to each iteration, and a portion of the listings have noisy position parameters (e.g., position values set to zero). At operation 615, the training engine 205 stores the trained machine learning model. At operation 620, the interface engine 200 receives a query from a network site user. At operation 625, the query engine 215 retrieves all matching listings that match the filters or parameters of the received query. At operation 630, the neural network engine 210 generates position debiased results rankings for the results returned at operation 625. At operation 635, the interface engine 200 displays the generated results.

Figure 7:
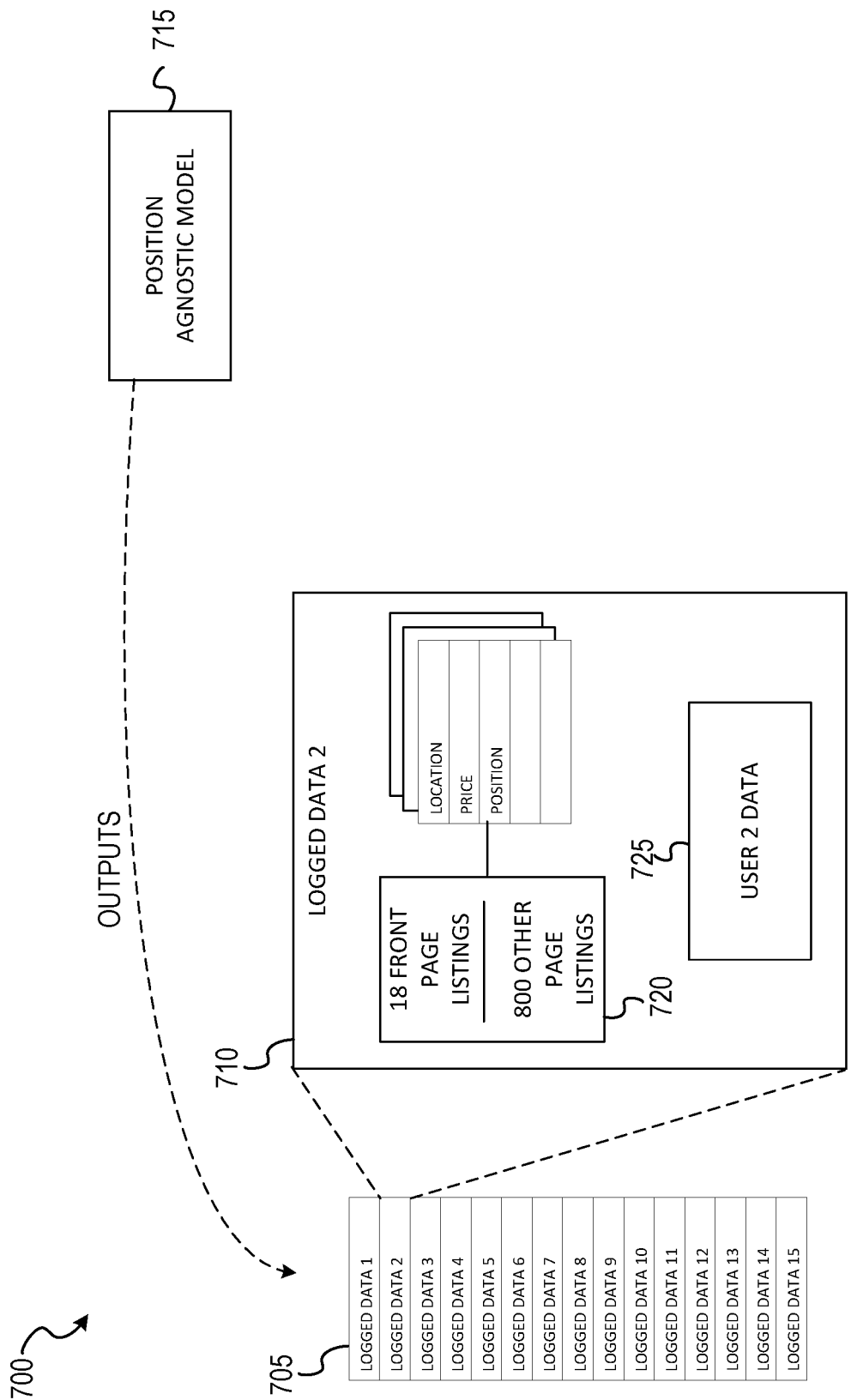
FIGS. 7-10 show an example data flow architecture for implementing the position debiased system, according to some example embodiments.

FIGS. 7-10 show an example data flow architecture 700 for implementing the position debiased system 150, according to some example embodiments. In FIG. 7, the logged data 705 is historical data of users searching on a network site. For example, as illustrated by expanded view 710, the logged data 2 includes user data 725 for a given user and corresponding search results shown to the user. For example, the user data 725 can include user information such as demographic data, past purchase, and a query submitted as a search result to the network site. Expanded view 710 further illustrates a user listings set 720, which are search result listings displayed to the given user in response to the given user's submitted query. For example, the user data 725 can include a query for a rental place listing in San Francisco, and the listings data can include 18 listings that were displayed on the first page to the user (e.g., seen listings set) and 800 additional listings that were not on the first page (e.g., 800 unseen listings set that were not viewed by the user). In some example embodiments, each of the returned listings includes parameter data such as the listing place's location, price, and position in the search (e.g., displayed third, displayed fifth, displayed 80th, etc.). In some example embodiments, the logged data 705 is generated by a machine leaching scheme or search engine that does not use position data as input feature data. For example, the logged data 705 can be generated for the user's submitted query using a conventional search engine that ranks results based on search word to description word similarity scores, or other non-position parameters. That is, the position-agnostic model 715 generates positions as output rankings, not input feature data. Thus, while the expanded view 710 displays that each position may be included for each listing, the position feature is stored data and is not used to generate further rankings by the position-agnostic model 715.

Figure 8:
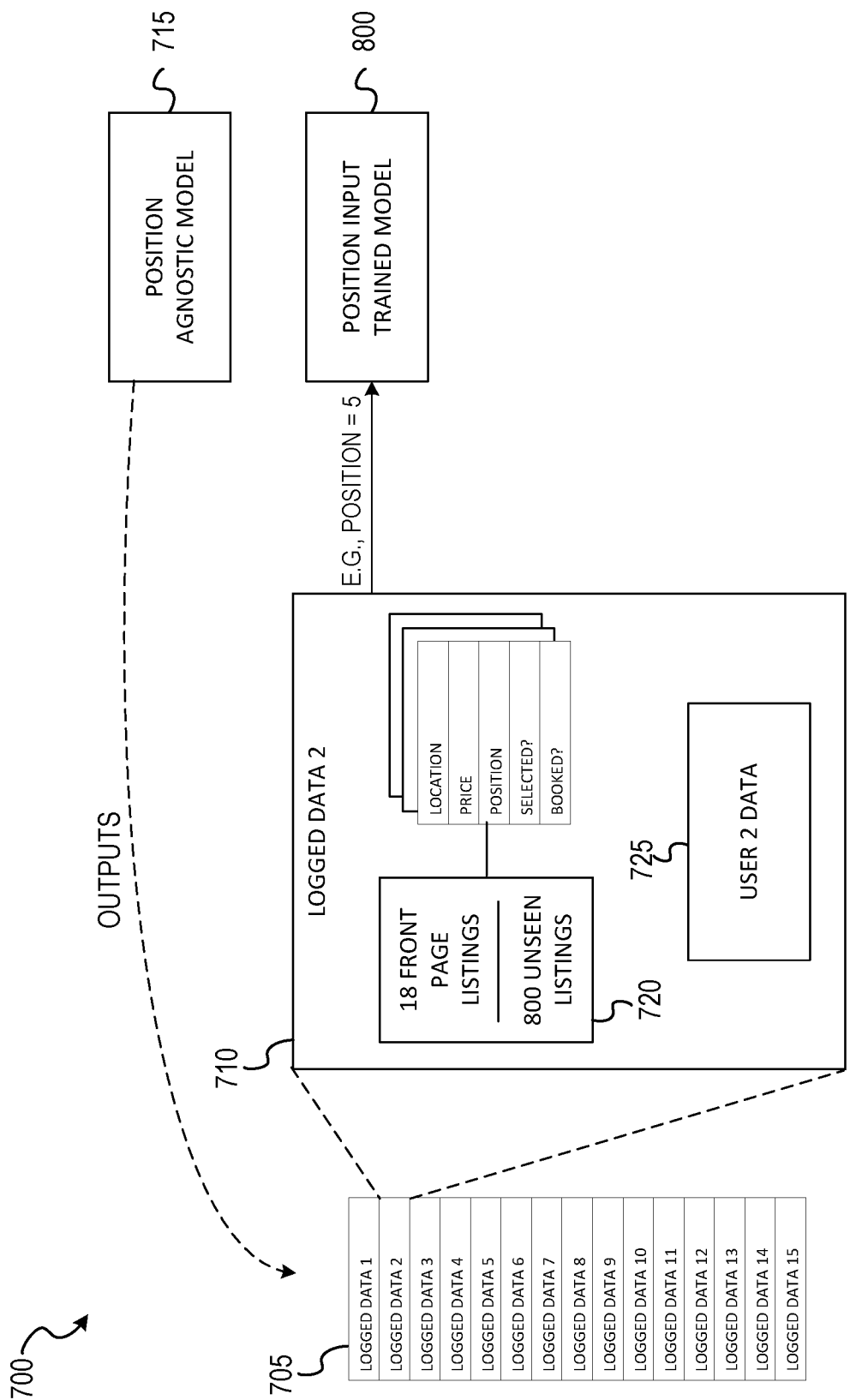

FIG. 8 shows a first training stage for a position debiased machine learning model, according to some example embodiments. The embodiment of FIG. 8 corresponds to the operation 310 in which the model is trained using position data as input data for each listing. As illustrated in the expanded view 710 in FIG. 8, the logged data 705 can be further augmented with parameter data indicating which of the listings in the logged data 705 was selected (e.g., viewed) and/or booked by the given user. For example, the user 2 may have submitted a query for temporary housing in San Francisco, viewed three of the listings on the front page results, and booked the listing that was in the second position from the top. In contrast to the position-agnostic model 715, the position input trained model 800 can receive position data for each of the listings in the user listings set 720 as input data for training, where the output is ranking data. For example, the position input trained model 800 can be a fully connected deep neural network that receives, as input data, the price of each listing in user listings set 720, the location of each listing in the user listings set 720, the position in which each listing appeared in the returned results, and whether the user selected or viewed the listing and an indication of whether the user booked the listing. The position input trained model 800 then generates a ranking for each of the listings using the input data.

Figure 9:
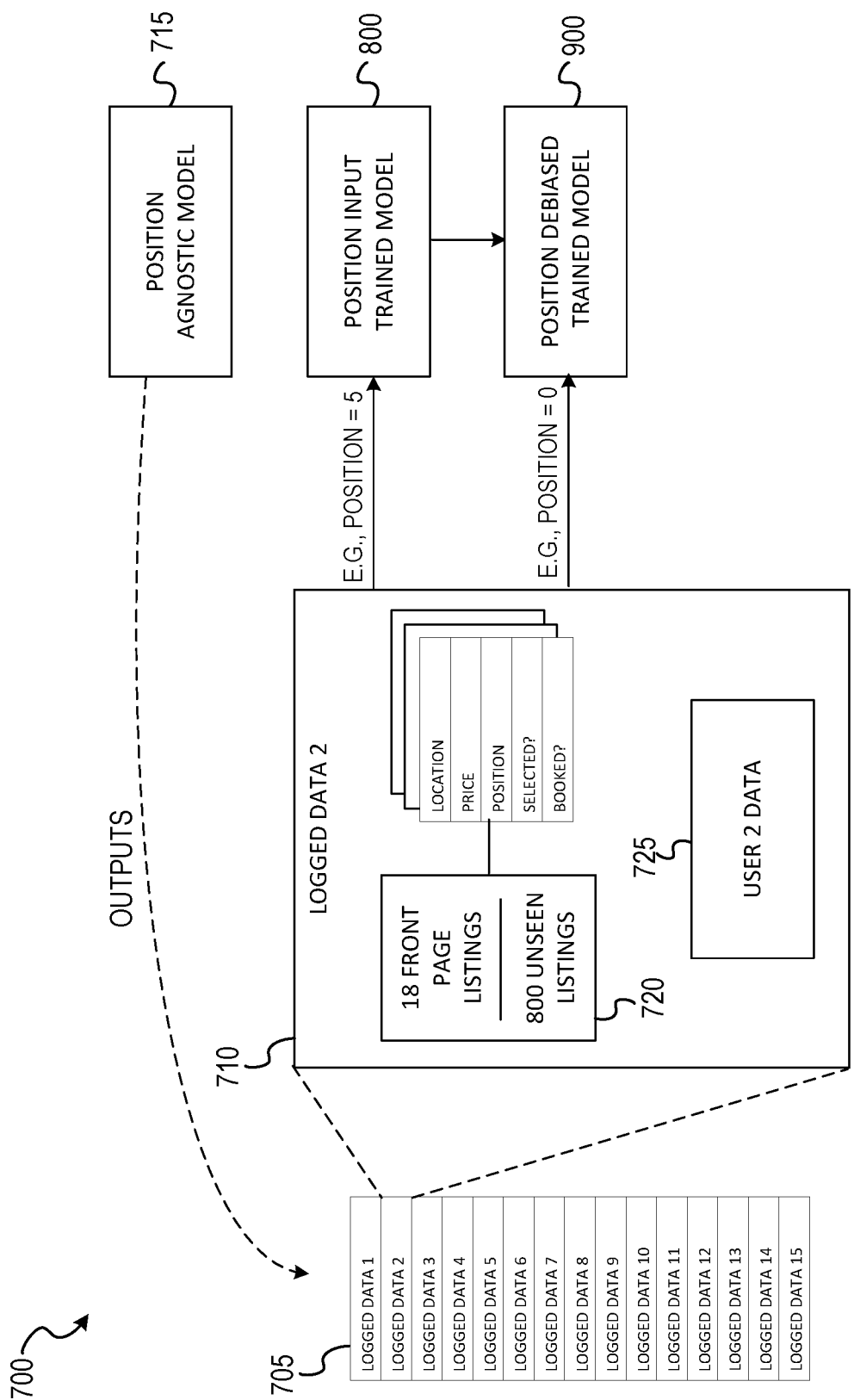

FIG. 9 shows a second training stage for a position debiased machine learning model, according to some example embodiments. The embodiment of FIG. 9 corresponds to the operation 315 in which the model is trained with arbitrary position data as noise. As discussed above, at runtime, the position debiased search model will not have position input data as that data has not been generated for the network site user. To train the model to learn position data embedded in the non-position features of the listings, a portion of the listings in the logged data 705 have their position feature parameter set to zero. For example, 15% of the listings in the user listings set 720 have their position data changed from whichever position the listing was actually displayed to the user to "0" to act as noise data for the position parameter. The position input trained model 800 is then trained on the logged data 705 where a portion of the listings have injected noise in the position feature to generate the position debiased trained model 900.

Figure 10:
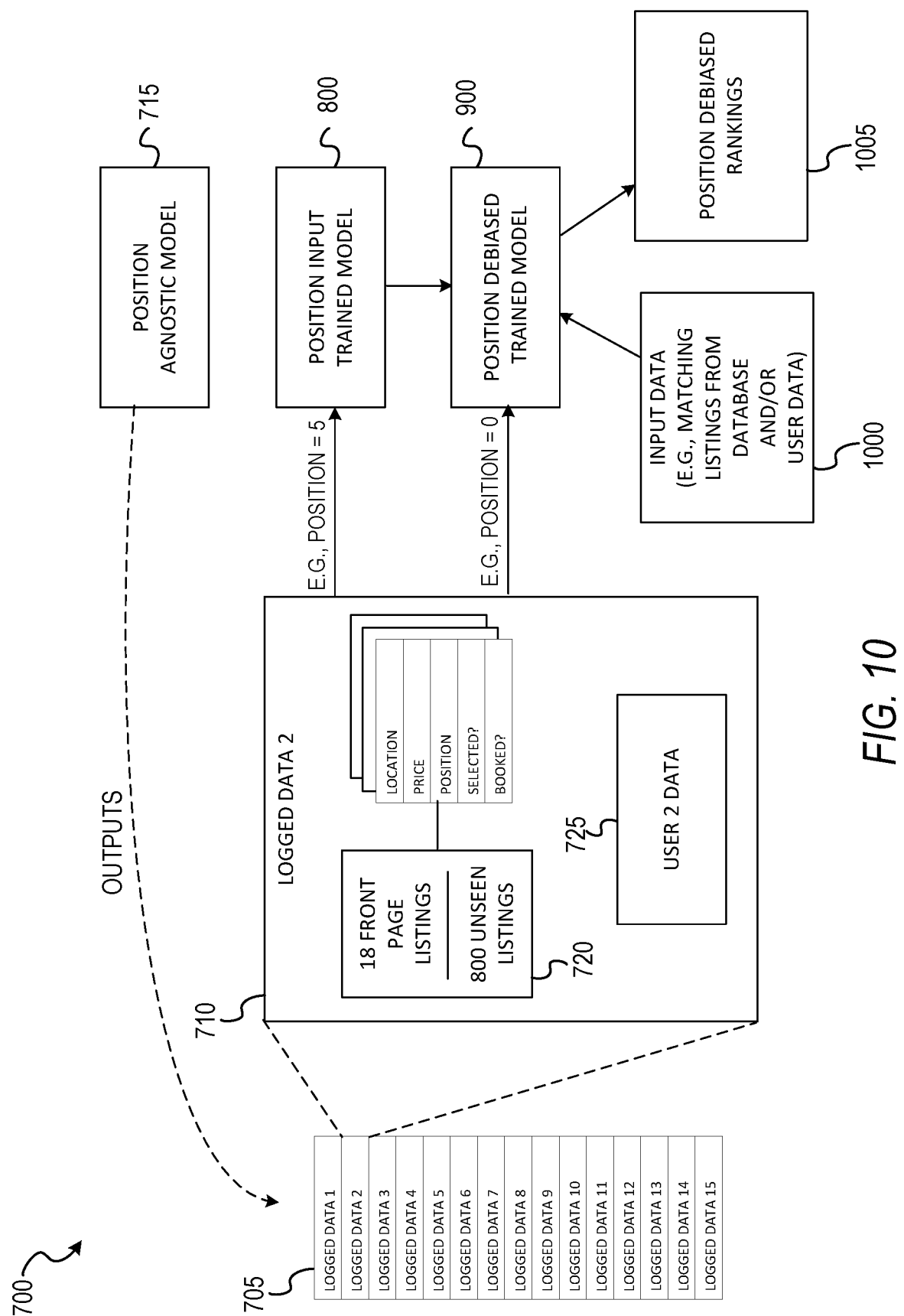
Figure 11:
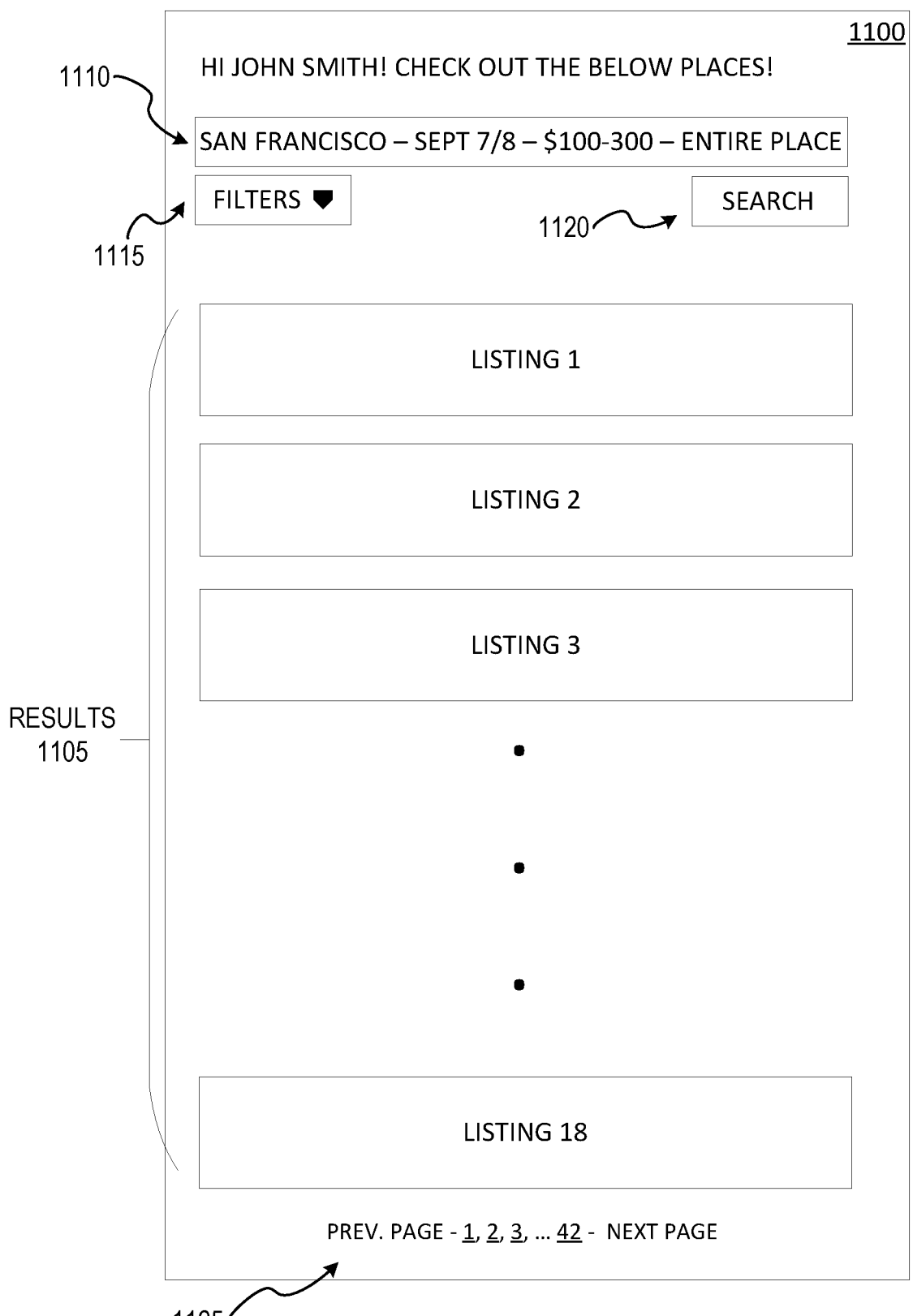
FIG. 11 shows an example search user interface, according to some example embodiments.

After training, the position debiased trained model 900 can then generate position debiased search results as illustrated in FIG. 10 and FIG. 11. Jumping to FIG. 11, a user (not depicted) is browsing a listings network site user interface 1100 (e.g., mobile application user interface, web browser user interface) that includes a search bar 1110, a filters drop-down menu button 1115 and a search button 1120. The user enters a query into the search bar 1110, such as a search for temporary housing in San Francisco on September 7th and 8th, with a price limit between $100 dollars and $300, and a category limitation of "Entire Place" (e.g., the user seeks to rent the entire residence for said dates, as opposed to renting a private room in another person's residence). The user can further customize the query directly using terms input into the search bar 1110 or filters listed via selection of the filters drop-down menu button 1115. Upon submitting the query via selection of the search button 1120, the interface engine 200 receives the query and the query network engine 215 retrieves all matching results that fit the filters in the query (e.g., between the price range, listings for an entire place) and stores the returned listing for position debiased ranking.

Turning to FIG. 10, the listings are input into the trained position debiased trained model 900 as input data 1000 and the position debiased trained model 900 outputs position debiased rankings 1005 that are ranked based on the user's query, user profile data, and the data or features of each listing. In some example embodiments, each of the listings that are input data do not have position data as they have not been listed yet; however, the position debiased trained model 900 has been trained with noise to implicitly avoid position bias and generate rankings in the position debiased rankings 1005 that do not exhibit position bias. Turning back to FIG. 11, the matching listings are then displayed in a search results area 1105 according to their position debiased rankings 1005. The user can then select the listings, or navigate to additional pages via page navigational elements 1125.

Figure 12:
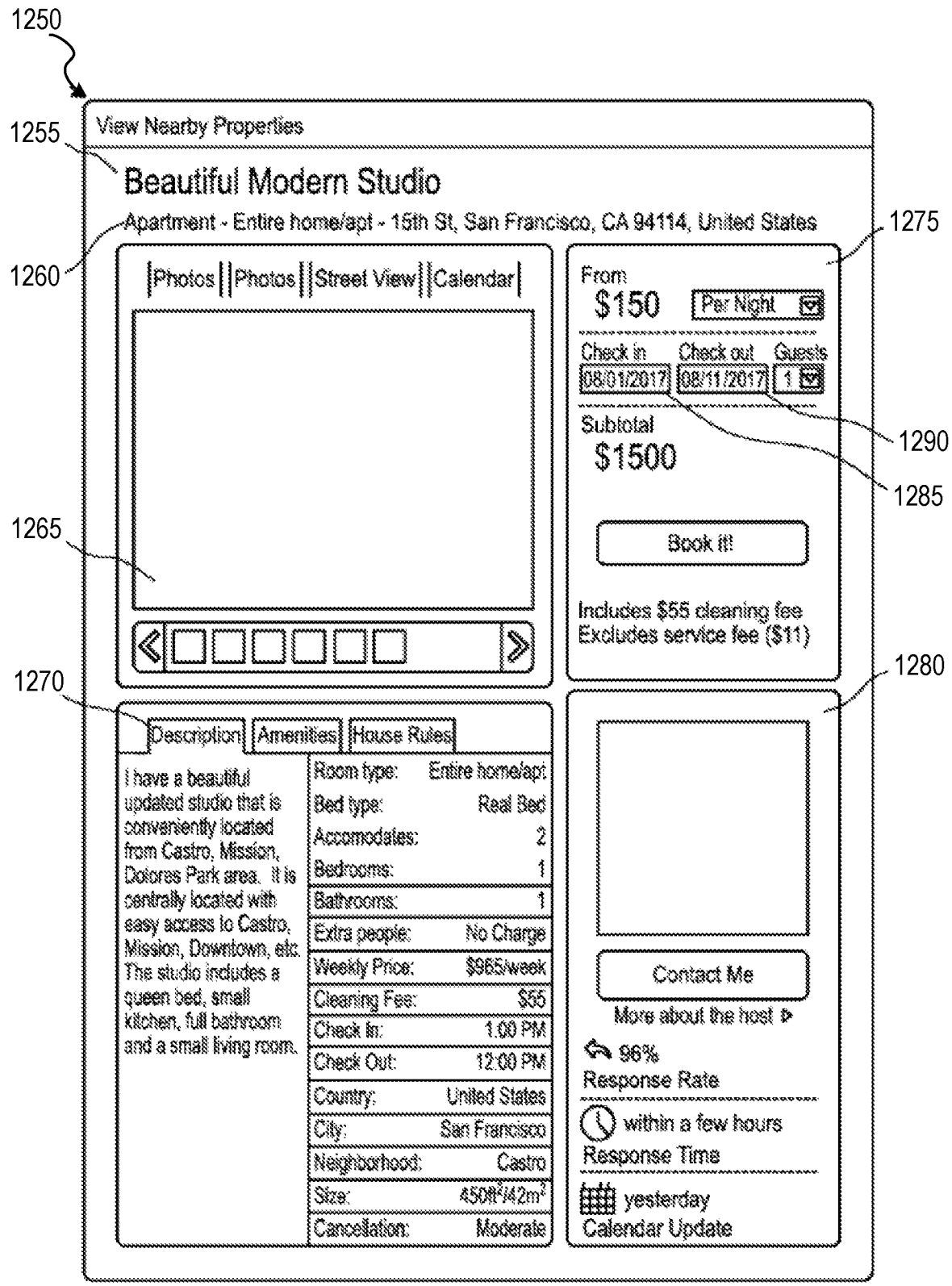
FIG. 12 shows an example search result item, according to some example embodiments.

FIG. 12 illustrates an example user interface 1250 for a description of a listing for a rental item (e.g., an apartment in San Francisco posted to a listings network site by a posting user, e.g., the apartment owner). The user interface 1250 is an example listing that can be displayed, for example, in response to the user selecting the first listing ("LISTING 1") in the search results area 1105 in FIG. 11. As illustrated, the example listing shown in FIG. 12 is for accommodations in San Francisco. In other examples, the listing could be for a tour, local experience, transportation, or other trip item. The listing may include a title 1255 and a brief description 1260 of the rental item. The listing may further include photos of the rental item, maps of the area or location associated with the rental item, a street view of the rental item, a calendar of the rental item, and so forth, which may be viewed in area 1265. The listing may include a detailed description 1270, pricing information 1275, and the listing host's information 1280. The listing may further allow a user to select a date range for the rental item by entering or choosing specific check-in date 1285 and check-out date 1290.

FIGS. 13-17 show example source code flow diagrams of structure source code included below, according to some example embodiments. The structure source code is an example implementation of the methods discussed above. Comment code is indicated by the use of two forward slashes. Some of the comments indicate which figure corresponds to the code below the comment. One of ordinary skill in the art appreciates that, although the structure source code may resemble a certain programming language, other programming languages can implement the structure source code below.

Figure 13:
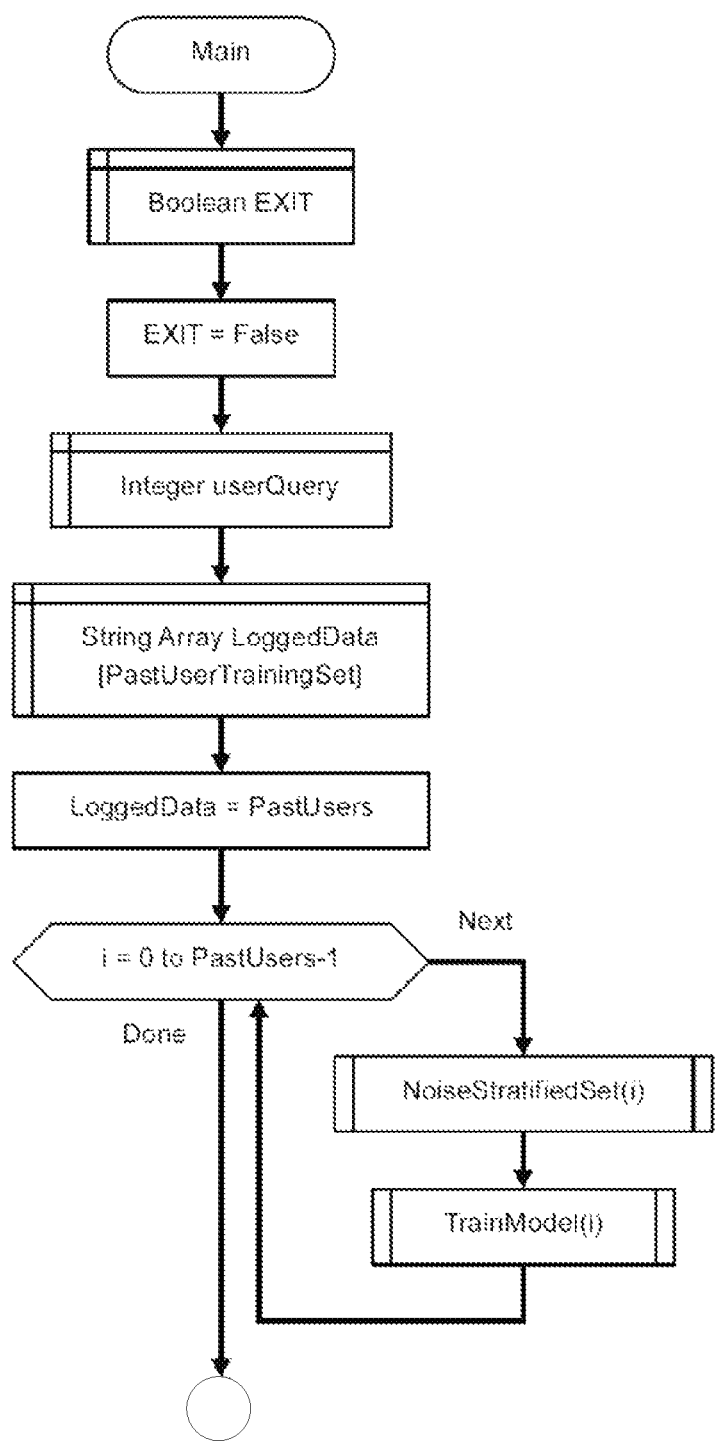
FIGS. 13-17 show example structure code, according to some example embodiments.
Figure 14:
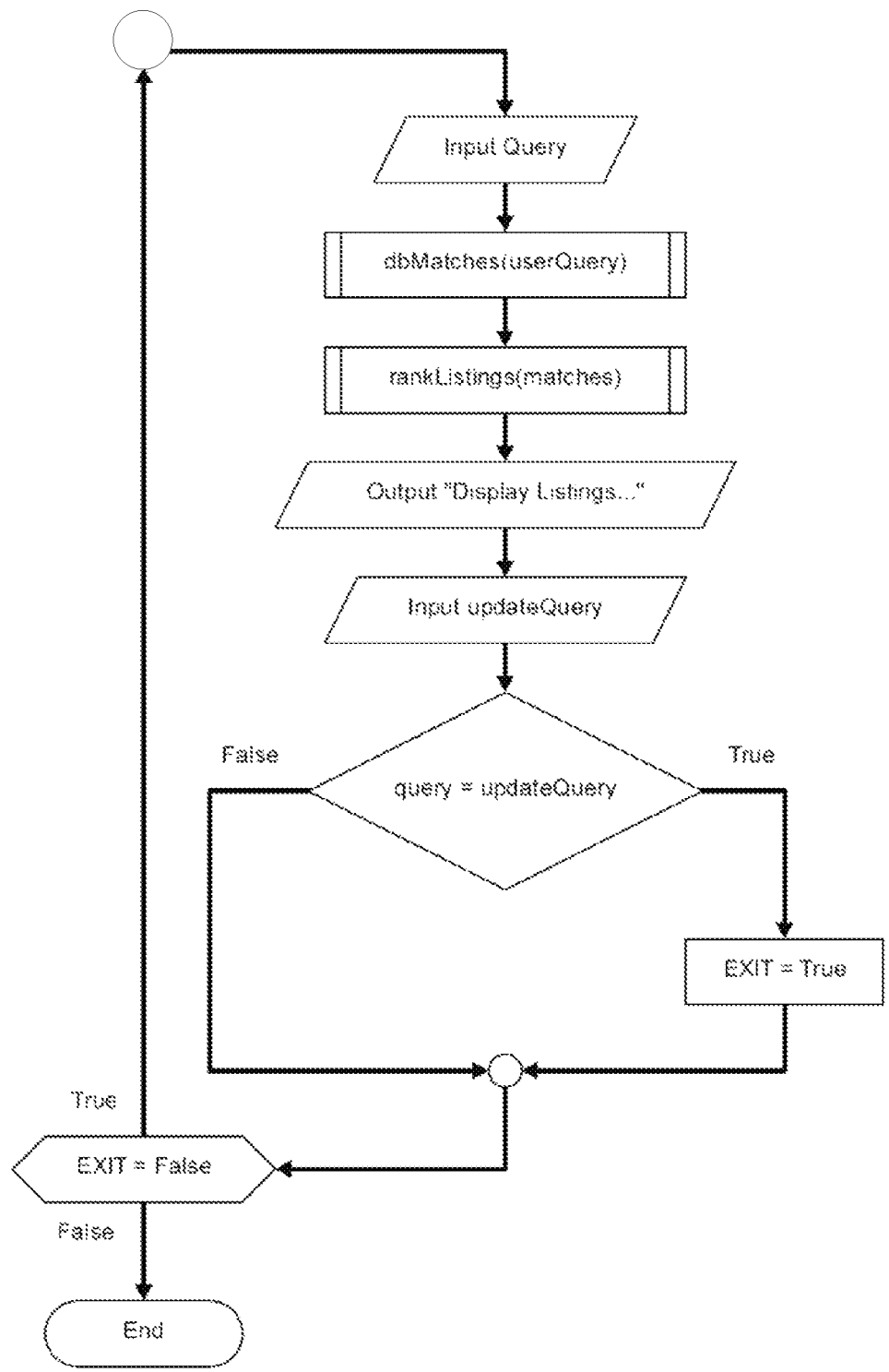
Figure 15:
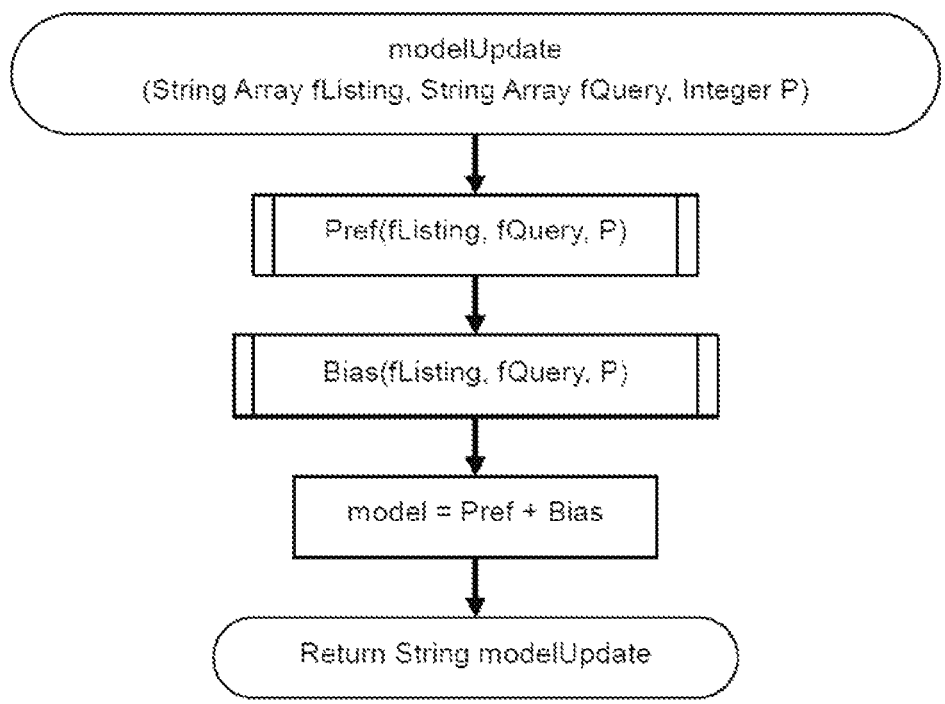
Figure 16:
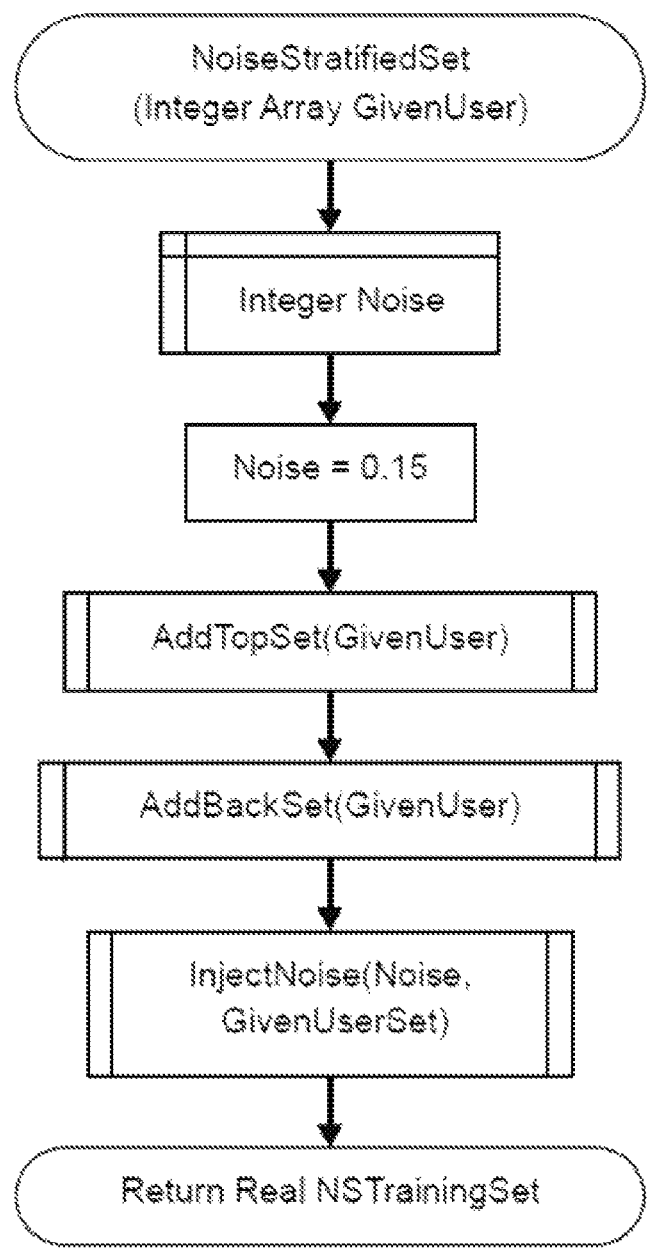
Figure 17:
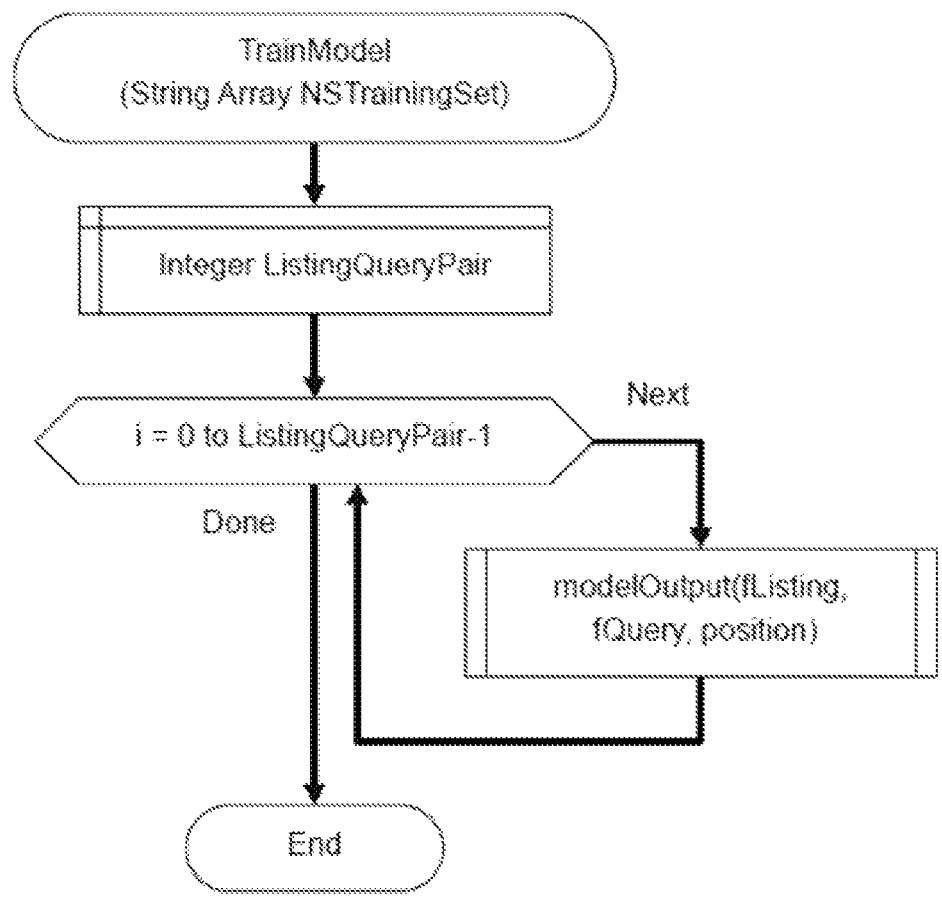

```
::::::::::BEGIN CODE::::::::::
#include <iostream>
#include <sstream>
#include <string>
#include <cstdlib>
#include <cmath>
using namespace std;
// Headers
string toString (double);
int toInt (string);
double toDouble (string);
string modelUpdate(string[ ] fListing, string[ ] fQuery, int p);
double noiseStratifiedSet(int[ ] givenUser);
void trainModel(string[ ] nSTrainingSet);
//FIG. 13
int main( ) {
    bool eXIT;
    eXIT = false;
    int userQuery;
    string loggedData[PastUserTrainingSet];
    // Logged Data is the network site historical search data (e.g., query,
user data, listings displayed), PastUser is the sub-set of LoggedData to
be used for training.
    loggedData = PastUsers;
    // For Loop is: For each PastUser in PastUsers: (1) NoiseStratify by
setting a portion of the position parameters to 0, and sample from seen
and unseen listings, and (2) train the machine learning model with the
noise stratified set for that iteration.
    for (i = 0; i <= PastUsers - 1; i++) {
        // NoiseStratifiedSet outputs 36 listings, 18 front page, 18
sampled from other pages, with a 15% noise position injection rate.
        noiseStratifiedSet(i);
        trainModel(i);
    }
//FIG. 14, model is trained and a query from a network site user
browsing the site is received.
do {
    // Receive network site query from site user (e.g., search for
listings in San Francisco for given date).
    cin >> Query;
    // dbMatches( ) returns all results from the database that match
```

-continued

```
the query, unranked. That is, if the listing is for September 8 and 9, in San
Francisco, then dbMatches returns all listings that match those
limitations.
        dbMatches(userQuery);
        // rankListings( ) ranks the matching queries returned from the
database using the position debiased trained model. Note: since the
listings do not have ranking positions at runtime, the position value for
each listing in the matches set is set to zero.
        rankListings(matches);
        // Display position debiased ranked listings to user.
        cout << "Display Listings..." << endl;
        // Receive an update to the query, such as a price filter or
location filter. If query does not equal the updateQuery, the updated query
is used to pull new results (e.g., new listings in a larger geographic search
area).
        cin >> updateQuery;
        if (Query == updateQuery) {
             eXIT = true;
        }
   } while (eXIT == false);
   return 0;
}
//FIG. 15
modelUpdate(string[ ] fListing, string[ ] fQuery, int p) {
    // fListing is the listing feature data, fQuery is the query data, and P
      is
position of the listing in the logged data.
    Pref(fListing, fQuery, p);
    Bias(fListing, fQuery, p);
    model = Pref + Bias;
    return modelUpdate;
}
//FIG. 16
noiseStratifiedSet(int[ ] givenUser) {
    int noise;
    // Noise ratio of listings to set the position to 0
    noise = 0.15;
    // Add Top Set of listings to the GivenUserSet for training, e.g., top
18 listings that appeared on the front page.
    AddTopSet(givenUser);
    // Add Non-front page listings to the GivenUserSet for training, e.g.,
random 18 listings that were not in the front page.
    AddBackSet(givenUser);
    // InjectNoise receives the noise ratio to set the position parameters to
zero, and further receives GivenUserSet which is the top 18 listings and
random 18 listings from other non-front page listings.
    InjectNoise(noise, GivenUserSet);
    return NSTrainingSet;
}
//FIG. 17
trainModel(string[ ] nSTrainingSet) {
    // TrainModel( ) receives NSTrainingSet (36 listings), and trains for
each listing/query pair, where the query data is static for each iteration
and listing data changes per iteration.
    int listingQueryPair;
    for (i = 0; i <= listingQueryPair − 1; i++) {
        // modelOutput trains a fully connected neural network, e.g., via
backpropagation training, to update the network data (e.g., weights) per
listing/query training iteration.
        modelOutput(fListing, fQuery, position);
    }
}
// The following implements type conversion functions.
string toString (double value) { //int also
    stringstream temp;
    temp << value;
    return temp.str( );
}
int toInt (string text) {
    return atoi(text.c_str( ));
}
double toDouble (string text) {
    return atof(text.c_str( ));
}
::::::::END CODE:::::::::
```

Figure 18:
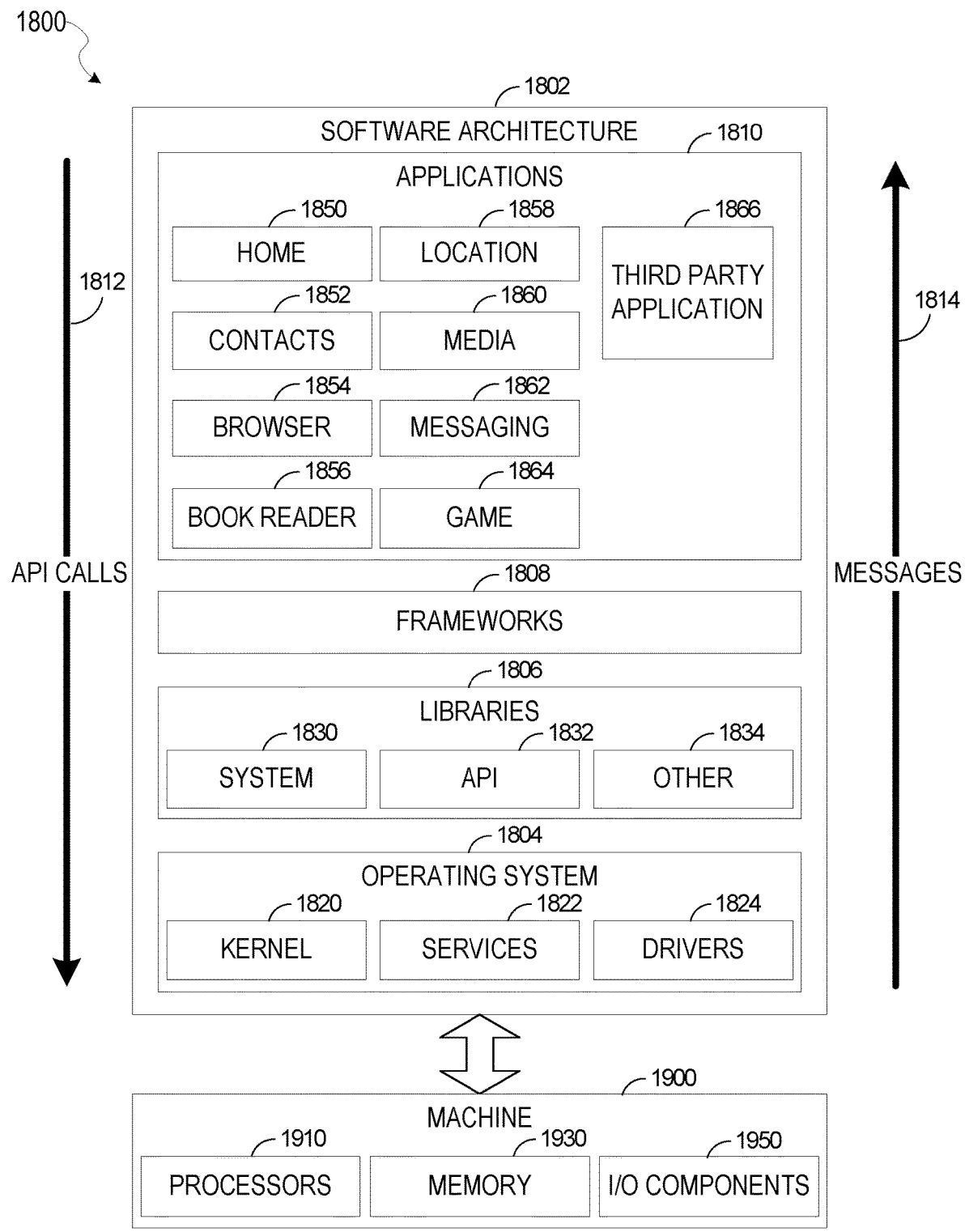
FIG. 18 is a block diagram illustrating architecture of software used to implement the user messaging system, according to some example embodiments.

FIG. 18 is a block diagram 1800 illustrating an architecture of software 1802, which can be installed on any one or more of the devices described above. FIG. 18 is merely a non-limiting example of a software architecture, and it will be appreciated that many other architectures can be implemented to facilitate the functionality described herein. In various embodiments, the software 1802 is implemented by hardware such as a machine 1900 of FIG. 19 that includes processors 1910, memory 1930, and input/output (I/O) components 1950. In this example architecture, the software 1802 can be conceptualized as a stack of layers where each layer may provide a particular functionality. For example, the software 1802 includes layers such as an operating system 1804, libraries 1806, frameworks 1808, and applications 1810. Operationally, the applications 1810 invoke API calls 1812 through the software stack and receive messages 1814 in response to the API calls 1812, consistent with some embodiments.

In various implementations, the operating system 1804 manages hardware resources and provides common services. The operating system 1804 includes, for example, a kernel 1820, services 1822, and drivers 1824. The kernel 1820 acts as an abstraction layer between the hardware and the other software layers, consistent with some embodiments. For example, the kernel 1820 provides memory management, processor management (e.g., scheduling), component management, networking, and security settings, among other functionality. The services 1822 can provide other common services for the other software layers. The drivers 1824 are responsible for controlling or interfacing with the underlying hardware, according to some embodiments. For instance, the drivers 1824 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 1806 provide a low-level common infrastructure utilized by the applications 1810. The libraries 1806 can include system libraries 1830 (e.g., C standard library) that can provide functions such as memory allocation functions, string manipulation functions, mathematic functions, and the like. In addition, the libraries 1806 can include API libraries 1832 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1806 can also include a wide variety of other libraries 1834 to provide many other APIs to the applications 1810.

The frameworks 1808 provide a high-level common infrastructure that can be utilized by the applications 1810, according to some embodiments. For example, the frameworks 1808 provide various graphic user interface (GUI) functions, high-level resource management, high-level location services, and so forth. The frameworks 1808 can provide a broad spectrum of other APIs that can be utilized by the applications 1810, some of which may be specific to a particular operating system or platform.

In an example embodiment, the applications 1810 include a home application 1850, a contacts application 1852, a browser application 1854, a book reader application 1856, a location application 1858, a media application 1860, a messaging application 1862, a game application 1864, and a broad assortment of other applications such as a third-party application 1866. According to some embodiments, the applications 1810 are programs that execute functions defined in the programs. Various programming languages can be employed to create one or more of the applications 1810, structured in a variety of manners, such as object-oriented programming languages (e.g., Objective-C, Java, or C++) or procedural programming languages (e.g., C or assembly language). In a specific example, the third-party application 1866 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1866 can invoke the API calls 1812 provided by the operating system 1804 to facilitate functionality described herein.

Figure 19:
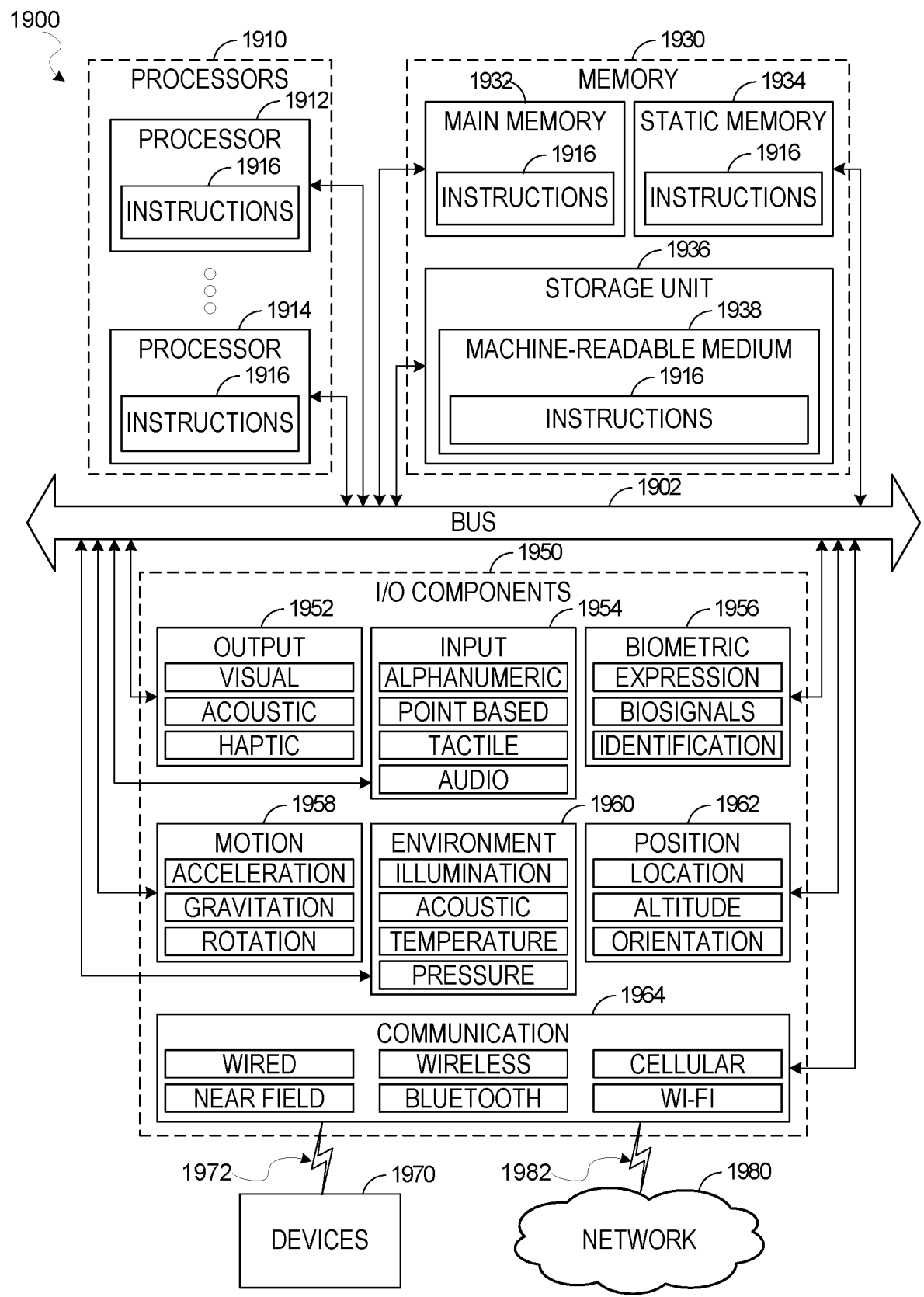
FIG. 19 shows a machine as an example computer system with instructions to cause the machine to implement the user message system, according to some example embodiments.

FIG. 19 illustrates a diagrammatic representation of a machine 1900 in the form of a computer system within which a set of instructions may be executed for causing the machine to perform any one or more of the methodologies discussed herein, according to an example embodiment. Specifically, FIG. 19 shows a diagrammatic representation of the machine 1900 in the example form of a computer system, within which instructions 1916 (e.g., software, a program, an application, an applet, an app, or other executable code) for causing the machine 1900 to perform any one or more of the methodologies discussed herein may be executed. The instructions 1916 transform the general, non-programmed machine 1900 into a particular machine 1900 programmed to carry out the described and illustrated functions in the manner described. In alternative embodiments, the machine 1900 operates as a standalone device or may be coupled (e.g., networked) to other machines. In a networked deployment, the machine 1900 may operate in the capacity of a server machine or a client machine in a server-client network environment, or as a peer machine in a peer-to-peer (or distributed) network environment. The machine 1900 may comprise, but not be limited to, a server computer, a client computer, a PC, a tablet computer, a laptop computer, a netbook, a STB, a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1916, sequentially or otherwise, that specify actions to be taken by the machine 1900. Further, while only a single machine 1900 is illustrated, the term "machine" shall also be taken to include a collection of machines 1900 that individually or jointly execute the instructions 1916 to perform any one or more of the methodologies discussed herein.

The machine 1900 may include processors 1910, memory 1930, and I/O components 1950, which may be configured to communicate with each other such as via a bus 1902. In an example embodiment, the processors 1910 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1912 and a processor 1914 that may execute the instructions 1916. The term "processor" is intended to include multi-core processors that may comprise two or more independent processors (sometimes referred to as "cores") that may execute instructions contemporaneously. Although FIG. 19 shows multiple processors 1910, the machine 1900 may include a single processor with a single core, a single processor with multiple cores (e.g., a multi-core processor), multiple processors with a single core, multiple processors with multiples cores, or any combination thereof.

The memory 1930 may include a main memory 1932, a static memory 1934, and a storage unit 1936, all accessible to the processors 1910 such as via the bus 1902. The main memory 1932, the static memory 1934, and storage unit 1936 store the instructions 1916 embodying any one or more of the methodologies or functions described herein. The instructions 1916 may also reside, completely or partially, within the main memory 1932, within the static memory 1934, within the storage unit 1936, within at least one of the processors 1910 (e.g., within the processor's cache memory), or any suitable combination thereof, during execution thereof by the machine 1900.

The I/O components 1950 may include a wide variety of components to receive input, provide output, produce output, transmit information, exchange information, capture measurements, and so on. The specific I/O components 1950 that are included in a particular machine will depend on the type of machine. For example, portable machines such as mobile phones will likely include a touch input device or other such input mechanisms, while a headless server machine will likely not include such a touch input device. It will be appreciated that the I/O components 1950 may include many other components that are not shown in FIG. 19. The I/O components 1950 are grouped according to functionality merely for simplifying the following discussion and the grouping is in no way limiting. In various example embodiments, the I/O components 1950 may include output components 1952 and input components 1954. The output components 1952 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1950 may include biometric components 1956, motion components 1958, environmental components 1960, or position components 1962, among a wide array of other components. For example, the biometric components 1956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like.

The motion components 1958 may include acceleration sensor components (e.g., accelerometer), gravitation sensor components, rotation sensor components (e.g., gyroscope), and so forth. The environmental components 1960 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1962 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1950 may include communication components 1964 operable to couple the machine 1900 to a network 1980 or devices 1970 via a coupling 1982 and a coupling 1972, respectively. For example, the communication components 1964 may include a network interface component or another suitable device to interface with the network 1980. In further examples, the communication components 1964 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1970 may be another machine or any of a wide variety of peripheral devices (e.g., a peripheral device coupled via a USB).

Moreover, the communication components 1964 may detect identifiers or include components operable to detect identifiers. For example, the communication components 1964 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1964, such as location via Internet Protocol (IP) geolocation, location via Wi-Fi® signal triangulation, location via detecting an NFC beacon signal that may indicate a particular location, and so forth.

The various memories (i.e., 1930, 1932, 1934, and/or memory of the processor(s) 1910) and/or storage unit 1936 may store one or more sets of instructions and data structures (e.g., software) embodying or utilized by any one or more of the methodologies or functions described herein. These instructions (e.g., the instructions 1916), when executed by processor(s) 1910, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1980 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1980 or a portion of the network 1980 may include a wireless or cellular network, and the coupling 1982 may be a Code Division Multiple Access (CDMA) connection, a Global System for Mobile communications (GSM) connection, or another type of cellular or wireless coupling. In this example, the coupling 1982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1916 may be transmitted or received over the network 1980 using a transmission medium via a network interface device (e.g., a network interface component included in the communication components 1964) and utilizing any one of a number of well-known transfer protocols (e.g., hypertext transfer protocol (HTTP)). Similarly, the instructions 1916 may be transmitted or received using a transmission medium via the coupling 1972 (e.g., a peer-to-peer coupling) to the devices 1970. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1916 for execution by the machine 1900, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A method comprising:
generating historical search result data of a network site comprising a plurality of past results presented on the network site comprising a set of seen search results and a set of unseen search results that a user did not navigate to, one or more indications of which of the plurality of past results were selected by network site users, and position data indicating a display position for each of the plurality of past results;
generating training data for a machine learning model by replacing a portion of the position data with arbitrary data comprising zeros and augmenting seen results that a user did navigate to with randomly sampled unseen results;
training the machine learning model using the position data with the portion of the position data replaced with arbitrary data and the augmented seen results to generate a position debiased machine learning scheme, wherein generating the position debiased machine learning scheme further comprises initially training the machine learning model on past position values in the historical search result data followed by retraining the machine learning model using the arbitrary data instead of the past position values;
receiving a search request from a network site user of the network site; and
generating search results for the network site user using the position debiased machine learning scheme.

2. The method of claim 1, further comprising:
causing display, on a client device of the network site user, of one or more of the search results generated by the position debiased machine learning scheme.

3. The method of claim 1, wherein the machine learning model is a deep neural network model and the position debiased machine learning scheme is a position debiased deep neural network.

4. The method of claim 1, wherein the arbitrary data is arbitrary in that it is not past position values from the historical search result data.

5. The method of claim 1, wherein the plurality of past results includes a portion of low-positioned results.

6. The method of claim 5, wherein the machine learning model is trained by sampling the low-positioned results.

7. The method of claim 5, wherein the portion of low-positioned results are non-displayed past results.

8. The method of claim 5, wherein the portion of low-positioned results are search results that were not displayed on a first page of search results.

9. A system comprising:
one or more processors of a machine; and
a memory storing instructions that, when executed by the one or more processors, cause the machine to perform operations comprising:
generating historical search result data of a network site comprising a plurality of past results presented on the network site comprising a set of seen search results and a set of unseen search results that a user did not navigate to, one or more indications of which of the plurality of past results were selected by network site users, and position data indicating a display position for each of the plurality of past results;
generating training data for a machine learning model by replacing a portion of the position data with arbitrary data comprising zeros and augmenting seen results that a user did navigate to with randomly sampled unseen results;
training the machine learning model using the position data with the portion of the position data replaced with arbitrary data and the augmented seen results to generate a position debiased machine learning scheme, wherein generating the position debiased machine learning scheme further comprises initially training the machine learning model on past position values in the historical search result data followed by retraining the machine learning model using the arbitrary data instead of the past position values;
receiving a search request from a network site user of the network site; and
generating search results for the network site user using the position debiased machine learning scheme.

10. The system of claim 9, the operations further comprising:
causing, display on a client device of the network site user, of one or more of the search results generated by the position debiased machine learning scheme.

11. The system of claim 9, wherein the machine learning model is a deep neural network model and the position debiased machine learning scheme is a position debiased deep neural network.

12. The system of claim 9, wherein the arbitrary data is arbitrary in that it is not past position values from the historical search result data.

13. The system of claim 9, wherein the plurality of past results includes a portion of low-positioned results.

14. A non-transitory machine-readable storage device embodying instructions that, when executed by a machine, cause the machine to perform operations comprising:
generating historical search result data of a network site comprising a plurality of past results presented on the network site comprising a set of seen search results and a set of unseen search results that a user did not navigate to, one or more indications of which of the plurality of past results were selected by network site users, and position data indicating a display position for each of the plurality of past results;
generating training data for a machine learning model by replacing a portion of the position data with arbitrary data comprising zeros and augmenting seen results that a user did navigate to with randomly sampled unseen results;
training the machine learning model using the position data with the portion of the position data replaced with arbitrary data and the augmented seen results to generate a position debiased machine learning scheme, wherein generating the position debiased machine learning scheme further comprises initially training the machine learning model on past position values in the historical search result data followed by retraining the machine learning model using the arbitrary data instead of the past position values;
receiving a search request from a network site user of the network site; and generating search results for the network site user using the position debiased machine learning scheme.

* * * * *